United States Patent
Yasuda

(10) Patent No.: US 12,330,628 B2
(45) Date of Patent: Jun. 17, 2025

(54) PARKING SUPPORT DEVICE AND MOBILE TERMINAL

(71) Applicant: TOYOTA JIDOSHA KABUSHIKI KAISHA, Toyota (JP)

(72) Inventor: Toshihiro Yasuda, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 210 days.

(21) Appl. No.: 18/091,619

(22) Filed: Dec. 30, 2022

(65) Prior Publication Data

US 2024/0217507 A1   Jul. 4, 2024

(30) Foreign Application Priority Data

Mar. 17, 2022   (JP) .................. 2022-042674

(51) Int. Cl.
  *B60W 30/06*   (2006.01)
  *B60W 10/26*   (2006.01)
  *B60W 50/02*   (2012.01)

(52) U.S. Cl.
  CPC ............ *B60W 30/06* (2013.01); *B60W 10/26* (2013.01); *B60W 50/0205* (2013.01); *B60W 2556/45* (2020.02)

(58) Field of Classification Search
  None
  See application file for complete search history.

(56) References Cited

U.S. PATENT DOCUMENTS

| | | | |
|---|---|---|---|
| 10,946,865 B1* | 3/2021 | Lin | B60W 50/0205 |
| 2009/0312012 A1* | 12/2009 | Tieman | B60R 25/102 |
| | | | 455/426.1 |
| 2013/0345903 A1* | 12/2013 | Nakagawa | H04L 67/01 |
| | | | 709/219 |
| 2014/0095057 A1* | 4/2014 | Takahashi | F02D 45/00 |
| | | | 701/112 |
| 2017/0021828 A1* | 1/2017 | Seo | B60W 10/10 |
| 2017/0129425 A1* | 5/2017 | Dalke | H04L 61/5014 |
| 2020/0159236 A1 | 5/2020 | Yoon | |
| 2020/0207334 A1 | 7/2020 | Cho | |
| 2021/0146885 A1* | 5/2021 | Arakawa | B60R 25/243 |
| 2021/0162988 A1 | 6/2021 | Kang | |
| 2021/0291764 A1* | 9/2021 | Koda | B60R 25/31 |
| 2022/0284813 A1* | 9/2022 | Sugano | B60W 30/06 |

(Continued)

FOREIGN PATENT DOCUMENTS

| | | |
|---|---|---|
| JP | 2006-302187 A | 11/2006 |
| JP | 2015-120403 A | 7/2015 |

(Continued)

*Primary Examiner* — Angela Y Ortiz
*Assistant Examiner* — Charles Pall
(74) *Attorney, Agent, or Firm* — Sughrue Mion, PLLC

(57) ABSTRACT

A parking ECU performs parking support control including power-off control for automatically switching a power supply of a vehicle from an ON state to an OFF state when an arrival condition that the vehicle arrives at a target parking position is satisfied, and performs abnormality notification for notifying a user of the vehicle that a power-off abnormality in which the power supply is not switched to the OFF state has occurred when the parking ECU is not switched to a non-operating state in a period from starting of the power-off control to elapse of a predetermined power-off delay time.

3 Claims, 20 Drawing Sheets

(56) References Cited

U.S. PATENT DOCUMENTS

2022/0292971 A1* 9/2022 Park .................... G06V 20/586
2022/0355791 A1* 11/2022 Hao .................... B60W 30/06

FOREIGN PATENT DOCUMENTS

| JP | 2020-075717 A | 5/2020 |
| JP | 2020-104844 A | 7/2020 |
| JP | 2021-084626 A | 6/2021 |

* cited by examiner

ABNORMALITY SCREEN

ARRIVAL SCREEN

SETTING SCREEN

ASCERTAINMENT SCREEN

OPERATION SCREEN

NORMAL COMPLETION SCREEN

PARKING SUPPORT DEVICE AND MOBILE TERMINAL

CROSS-REFERENCE TO RELATED APPLICATION

This application claims priority to Japanese Patent Application No. 2022-042674 filed on Mar. 17, 2022, incorporated herein by reference in its entirety.

BACKGROUND

1. Technical Field

The disclosure relates to a parking support device that switches a power supply of a vehicle from an ON state to an OFF state when the vehicle arrives at a target parking position and a mobile terminal that sets up communication with a vehicle configured to switch a power supply from an ON state to an OFF state when the vehicle arrives at a target parking position.

2. Description of Related Art

In the related art, a parking support device that performs automatic parking control for causing a vehicle to travel automatically to a target parking position is known. For example, a parking support device described in Japanese Unexamined Patent Application Publication No. 2015-120403 (JP 2015-120403 A) (hereinafter referred to as a "device according to the related art") starts determining whether a driver of a vehicle has alighted when the vehicle arrives at a target parking position and switches a power supply of the vehicle to an OFF state when it is determined that the driver has alighted.

SUMMARY

However, the power supply may not be switched to the OFF state due to malfunction of an ECU that controls a power supply state, an abnormality of a CAN, or the like. When the power supply is not switched to the OFF state after a driver has alighted, the vehicle is left alone in a state in which the power supply is in an ON state. In this case, there are a likelihood that the vehicle will be stolen and a likelihood that electric power stored in a battery of the vehicle will be exhausted.

The disclosure provides a parking support device and a mobile terminal that can notify a user of a vehicle that a power supply of the vehicle is not switched to an OFF state and prevent a vehicle from being left alone in a state in which the power supply is in an ON state.

According to an aspect of the disclosure, there is provided a parking support device including: a power supply (36) configured to supply electric power to a device mounted in a vehicle; and a first control unit (20) configured to be switched to an operating state by supplying electric power from the power supply when the power supply is in an ON state and to be switched to a non-operating state by stopping supply of electric power from the power supply when the power supply is in an OFF state, wherein the first control unit is configured to perform parking support control including power-off control (530, Step 1070) for automatically switching the power supply from the ON state to the OFF state when an arrival condition that the vehicle has traveled and arrived at a preset target parking position is satisfied (522, "YES" in Step 1050) and to perform abnormality notification for notifying a user of the vehicle that a power-off abnormality in which the power supply is not switched to the OFF state has occurred (Step 1120, Step 1125) when a power-off abnormality condition that the first control unit is not switched to the non-operating state in a period from starting of the power-off control to elapse of a predetermined power-off delay time (Toff) is satisfied (702, "YES" in Step 1115).

When the power supply is switched to the OFF state, the first control unit is switched to the non-operating state. When the first control unit is in the non-operating state even if the power-off delay time has elapsed after the vehicle has arrived at the target parking position and the power-off control has been started (that is, when the power-off abnormality condition has been satisfied), there is a high likelihood that a power-off abnormality in which the power supply is not switched to the OFF state for some reason will occur. In this case, the parking support device performs the abnormality notification. Accordingly, the user can see that the power-off abnormality has occurred and it is possible to prevent the vehicle from being left in a state in which the power supply is in the ON state.

In the parking support device according to the aspect, the first control unit may be configured to perform the parking support control further including automatic parking control for causing the vehicle to travel autonomously to the target parking position and to stop at the target parking position (520, Step 1035, Step 1045) in accordance with an instruction signal transmitted to the vehicle by a mobile terminal of which communicative connection with the vehicle to enable data exchange is able to be set up and which is carried by the user (518, "YES" in Step 1010), and to perform the abnormality notification by transmitting an abnormality signal for causing the mobile terminal to display an abnormality screen for notifying the user that the power-off abnormality has occurred to the mobile terminal (704, Step 1120) when the power-off abnormality condition is satisfied.

With this configuration, when the power-off abnormality condition is satisfied, an abnormality signal for displaying an abnormality screen is transmitted to the mobile terminal. The mobile terminal displays the abnormality screen when the abnormality signal is received. Even when the user operates the mobile terminal outside of the vehicle to transmit an instruction signal to the vehicle, it is possible to notify the user that the power-off abnormality has occurred.

In the parking support device according to the aspect, the first control unit may be configured to transmit an arrival signal for causing the mobile terminal to display an arrival screen for notifying the user that the vehicle has arrived at the target parking position (FIG. 4B) to the mobile terminal (526, Step 1060) when the arrival condition is satisfied (522, "YES" in Step 1050).

With this configuration, when the arrival condition is satisfied, the arrival signal is transmitted to the mobile terminal. When the arrival signal is received, the mobile terminal displays the arrival screen. Accordingly, it is possible to notify the user that the vehicle has arrived at the target parking position.

In the parking support device according to the aspect, the first control unit may be configured to identify a reason for the power-off abnormality (Step 1415, Step 1435, Step 1115), and to transmit the abnormality signal including information capable of identifying the reason for the power-off abnormality to the mobile terminal such that the mobile terminal displays the abnormality screen in a mode in which the reason for the power-off abnormality is able to be identified (Step 1425, Step 1445, Step 1620, Step 1630, Step 1120).

With this configuration, since the abnormality screen is displayed on the mobile terminal in a mode in which the reason of the power-off abnormality can be identified, the user can see the reason for the power-off abnormality in addition to occurrence of the power-off abnormality. Accordingly, the user can appropriately take measures according to the reason for the power-off abnormality.

The parking support device according to the aspect may further include a second control unit (30) configured to switch the power supply to one of the ON state and the OFF state and a third control unit (40, 50, 60, 70, 80), the first control unit, the second control unit, and the third control unit may be connected to each other such that data exchange is possible via an onboard network (CAN) and be configured to transmit a normal operating signal to the onboard network whenever a predetermined transmission time elapses, the first control unit may be configured to identify the reason for the power-off abnormality as being an abnormality of the second control unit when the normal operating signal from the second control unit is not received and the normal operating signal from the third control unit is received (YES in Step 1415), to identify the reason for the power-off abnormality as being an abnormality of the onboard network when the normal operating signals from none of the second control unit and the third control unit are received ("YES in Step 1435), and to identify the reason for the power-off abnormality as being an abnormality of the power supply when the normal operating signals from the second control unit and the third control unit are received and the power-off abnormality conditions is satisfied ("YES in Step 1115).

When the normal operating signal from the second control unit is not received and the normal operating signal from the third control unit is received, there is a high likelihood that the second control unit will not be able to transmit the normal operating signal because an abnormality has not occurred in the onboard network but an abnormality has occurred in the second control unit. In this case, with this configuration, the reason for the power-off abnormality is identified as being an abnormality of the second control unit.

When the normal operating signals from the second control unit and the third control unit are not received, there is a high likelihood that the normal operating signal will not be able to be received because an abnormality occur in the onboard network. In this case, with this configuration, the reason for the power-off abnormality is identified as being an abnormality of the onboard network.

When the normal operating signals from the second control unit and the third control unit are received and the power-off abnormality control is satisfied, there is a high likelihood that an abnormality will occur in the power supply because no abnormality has occurred in the onboard network, the second control unit, and the third control unit. In this case, with this configuration, the reason for the power-off abnormality is identified as being an abnormality of the power supply.

With this configuration, since the reason for the power-off abnormality is identified using the aforementioned identification method, it is possible to accurately identify the reason for the power-off abnormality.

In the parking support device according to the aspect, the first control unit may be configured to perform the abnormality notification before the power-off abnormality condition is satisfied (Step 1425, Step 1445, Step 1620, Step 1630) when an abnormality of the second control unit or an abnormality of the onboard network has been identified ("YES" in Step 1415, "YES" in Step 1435).

Since an abnormality of the second control unit and an abnormality of the onboard network are identified based on the normal operating signal, the abnormalities can be identified before the predetermined power-off delay time elapses (before the power-off abnormality condition is satisfied) after the power-off control has been started. Accordingly, with this configuration, when an abnormality of the second control unit or an abnormality of the onboard network has been identified, the abnormality notification is performed before the power-off abnormality condition is satisfied. Accordingly, the user can immediately see that the power-off abnormality has occurred.

In the parking support device according to the aspect, the first control unit may be configured to transmit an arrival signal for causing the mobile terminal to display an arrival screen (FIG. 4B) for notifying the user that the vehicle has arrived at the target parking position to the mobile terminal (526, Step 1060) when the arrival condition is satisfied (522, "YES" in Step 1050). The communicative connection may be cut off when the power supply is switched to the OFF state (534), and the mobile terminal displays the abnormality screen (806, Step 1330) when the communicative connection is not cut off in a period from reception of the arrival signal to elapse of a predetermined cutoff delay time (Tdcn) (804, "YES" in Step 1325). The first control unit may be configured to set the power-off delay time to be shorter than the cutoff delay time in advance.

A time corresponding to a delay time in communicative connection is required until the mobile terminal receives an abnormality signal after the first control unit has transmitted the abnormality signal. With this configuration, the power-off delay time is set to be shorter than the cutoff delay time. Accordingly, it is possible to prevent the power-off delay time from elapsing before the mobile terminal receives the "abnormality signal transmitted from the first control unit" even if the first control unit has transmitted the abnormality signal. In addition, when the abnormality signal includes information capable of identifying the reason for the power-off abnormality, it is possible to enhance the likelihood that the abnormality screen will be displayed in the mode in which the reason for the power-off abnormality can be identified.

According to another aspect of the disclosure, there is provided a mobile terminal configured to set up communicative connection with a vehicle that performs parking support control including automatic parking control (520, Step 1035, Step 1045) for causing a vehicle to travel to a predetermined target parking position in an ON state in which a power supply (36) of the vehicle supplies electric power to a device mounted in the vehicle and power-off control (530, Step 1070) for switching the power supply from the ON state to an OFF state in which the power supply does not supply electric power to the device when an arrival condition that the vehicle has arrived at a target parking position is satisfied such that data exchange is possible and to transmit an instruction signal for causing the vehicle to perform the automatic parking control to the vehicle (518), wherein the mobile terminal is configured to cut off the communicative connection when the power supply is switched from the ON state to the OFF state (534), and wherein the mobile terminal is configured to display an abnormality screen for notifying a user of the vehicle that a power-off abnormality in which the power supply is not switched to the OFF state has occurred (1330) when the arrival condition is satisfied and the communicative connection is not cut off in a period from reception of an arrival signal transmitted by the vehicle to elapse of a predetermined cutoff delay time (Tdcn) (804, "YES" in Step 1325).

With this configuration, the mobile terminal can detect that the power-off abnormality in which the power supply is not switched to the OFF state even when the vehicle has arrived at the target parking position has occurred, and notify a user that the power-off abnormality has occurred. Accordingly, the user can see that the power-off abnormality has occurred, and it is possible to prevent the vehicle from being left in a state in which the power supply is in the ON state.

In the mobile terminal according to the aspect, the mobile terminal may be configured to display an arrival screen for notifying the user that the vehicle has arrived at the target parking position (528, Step 1220) when the arrival signal is received (526, "YES" in Step 1210).

With this configuration, since the mobile terminal displays the arrival screen when the vehicle has arrived at the target parking position, it is possible to notify the user that the vehicle has arrived at the target parking position.

In the mobile terminal according to the aspect, the mobile terminal may be configured to display a normal completion screen for notifying the user that the parking support control has been completed normally (536, Step 1340) when the communicative connection has been cut off in the period from reception of the arrival signal to elapse of the cutoff delay time (534, "YES" in Step 1315).

When the communicative connection is cut off in the period from reception of the arrival signal to elapse of the cutoff delay time, the power supply of the vehicle is switched to the OFF state after the vehicle has arrived at the target parking position. With this configuration, since the normal completion screen is displayed in this case, it is possible to notify the user that the parking support control has been completed normally without occurrence of the power-off abnormality.

In the mobile terminal according to the aspect, the mobile terminal may be configured to display the abnormality screen (706, Step 1330) when an abnormality signal transmitted by the vehicle when the power supply is not switched to the OFF state in the period from starting of the power-off control to elapse of a predetermined power-off delay time (Toff) (702) is received (704, "YES" in Step 1310).

With this configuration, even when the power-off abnormality in which the power supply is not switched to the OFF state is detected by the vehicle, the mobile terminal can display the abnormality screen. Accordingly, even when the vehicle detects the power-off abnormality, it is possible to notify the user of the power-off abnormality.

In the mobile terminal according to the aspect, the mobile terminal may be configured to set the cutoff delay time to be longer than the power-off delay time in advance.

Since a time corresponding to a delay time in communicative connection is required until the mobile terminal receives an abnormality signal after the vehicle has transmitted the abnormality signal, the cutoff delay time is set to be longer than the power-off delay time in this aspect.

In the aforementioned description, names and/or reference signs in parentheses mentioned in the following embodiments are added to elements of the disclosure corresponding to the embodiments for the purpose of easy understanding of the disclosure. However, the elements of the disclosure are not limited to the embodiments defined by the names and/or reference signs. Other intentions and features of the disclosure and incidental advantages thereof will be easily understood from the description below of the embodiments of the disclosure which will be described later with reference to the accompanying drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
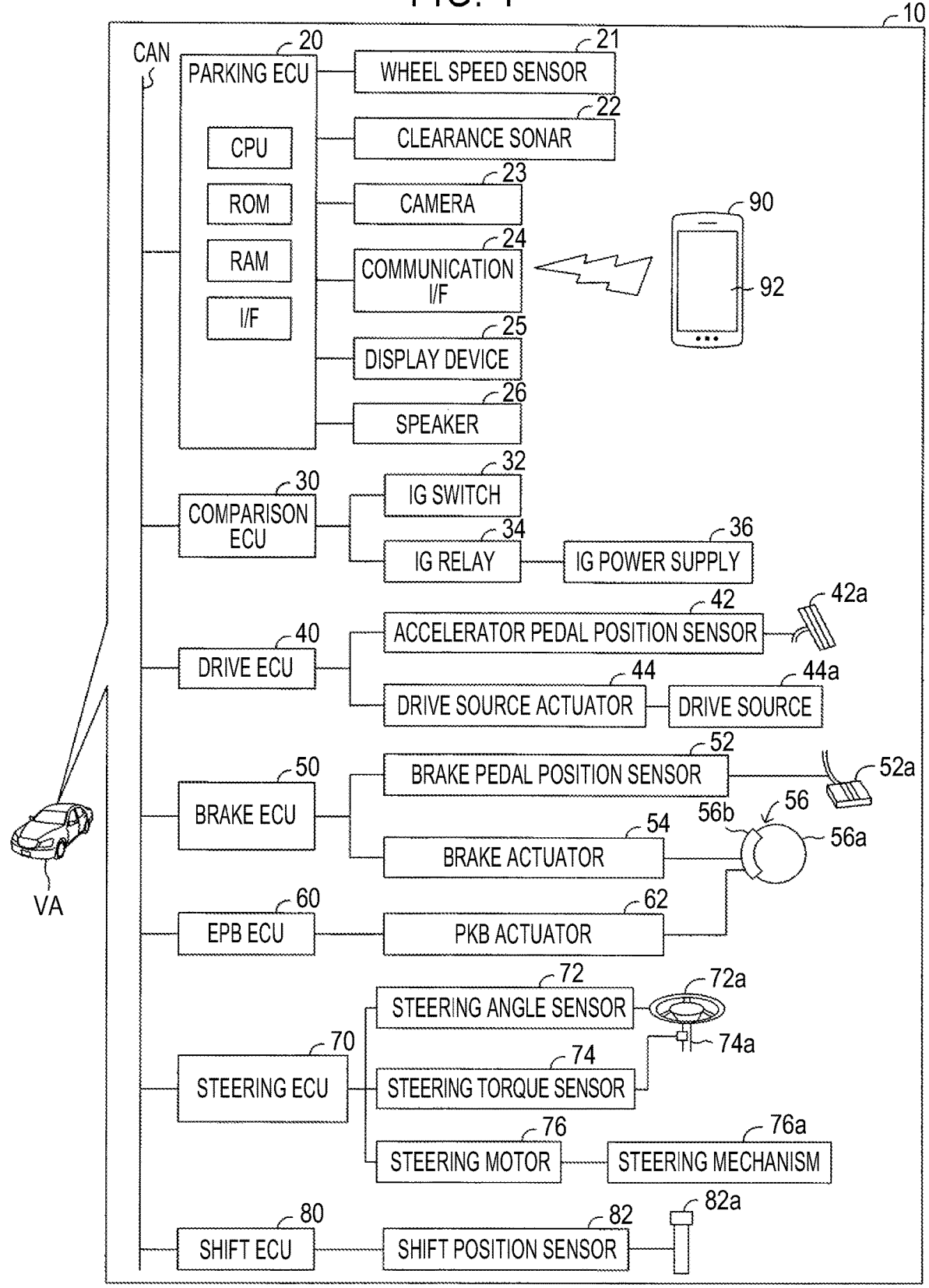
FIG. 1 is a diagram schematically illustrating a system configuration of a parking support device according to an embodiment of the disclosure.

A parking support device 10 according to an embodiment of the disclosure (hereinafter referred to as the "present support device 10") is mounted in a vehicle VA. As illustrated in FIG. 1, the parking support device 10 includes a parking ECU 20, a comparison ECU 30, a drive ECU 40, a brake ECU 50, an electric parking brake (EPB) ECU 60, a steering ECU 70, and a shift ECU 80. These ECUs are connected to each other such that they can exchange data (communicate) with each other via a controller area network (CAN). The CAN is also referred to as an "onboard network."

ECU is an abbreviation of electronic control unit and is an electronic control circuit having a microcomputer including a CPU, a ROM, a RAM, and an interface (I/F) as a principal constituent component. The ECU may be referred to as a "control unit," a "controller," or a "computer." The CPU realizes various functions by executing an instruction (a routine) stored in a memory (ROM). All of some of the ECUs 20 to 80 may be integrated in one ECU.

The parking ECU 20 may be referred to as a "first control unit," and the comparison ECU 30 may be referred to as a "second control unit." At least one of the drive ECU 40, the brake ECU 50, the EPB ECU 60, the steering ECU 70, and the shift ECU 80 may be referred to as a "third control unit."

The parking ECU 20 is connected to a plurality of wheel speed sensors 21, a plurality of clearance sonars 22, a plurality of cameras 23, a communication interface (I/F) 24, a display device 25, and a speaker 26 such that data exchange therebetween is possible.

The wheel speed sensor 21 is provided for each wheel of the vehicle VA and generates one pulse signal whenever the corresponding wheel rotates by a predetermined angle. The parking ECU 20 measures the number of pulses per unit time of the pulse signals generated by the wheel speed sensors 21 and acquires a rotation speed of each wheel (a wheel speed) based on the measured number of pulses. The parking ECU 20 acquires a vehicle speed Vs indicating a speed of the vehicle VA based on the rotation speeds of the wheels. For example, an average value of the rotation speeds of four wheels is acquired as the vehicle speed Vs.

Four clearance sonars 22 are provided in a front end of the vehicle VA, and four clearance sonars 22 are provided in a rear end of the vehicle VA. The clearance sonars 22 detect a stationary object such as a wall using ultrasonic waves and transmit a result of detection to the parking ECU 20. The parking ECU 20 detects a stationary object in front of the vehicle VA based on the result of detection from the clearance sonars 22 provided in the front end of the vehicle VA and detects a stationary object behind the vehicle VA based on the result of detection from the clearance sonars 22 provided in the rear end of the vehicle VA.

Four cameras 23 are mounted in the vehicle VA. Specifically, one camera 23 is provided in the vicinity of the center in a vehicle width direction of a front grille of the vehicle VA, and this camera 23 images an area in front of the vehicle VA. One camera 23 is provided in the vicinity of the center in the vehicle width direction of a back door of the vehicle VA, and this camera 23 images an area behind the vehicle VA. One camera 23 is provided in a left side mirror of the vehicle VA, and the camera 23 images an area on the left side of the vehicle VA. One camera 23 is provided in a right side mirror of the vehicle VA, and this camera images an area on the right side of the vehicle VA.

The cameras 23 transmit image data acquired by imaging the areas to the parking ECU 20. The parking ECU 20 generates image data of an area near the vehicle VA by synthesizing the image data.

The communication I/F 24 is an interface that sets up radio communicative connection with a device serving as a connection destination which is set in advance and performs radio communication. In this example, a mobile terminal 90 of a user (a driver or an occupant) of the vehicle VA is set in advance as the device serving as a connection destination.

Figure 2:
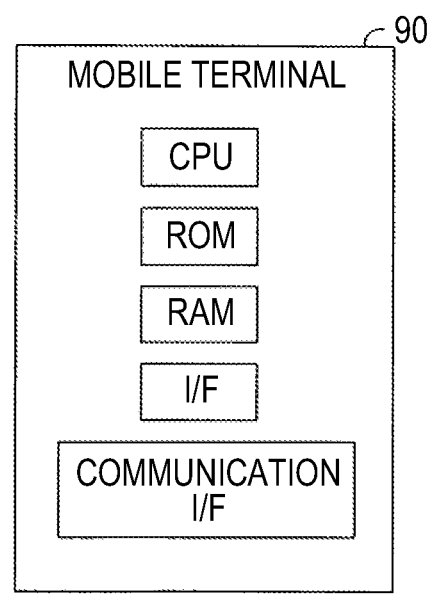
FIG. 2 is a diagram schematically illustrating a system configuration of a mobile terminal according to the embodiment of the disclosure.

The mobile terminal 90 is, for example, a smartphone or a tablet and includes a display device 92. For example, the display device 92 is a touch panel type display device. The mobile terminal 90 includes a CPU, a ROM, a RAM, an interface (I/F), and a communication interface (I/F) as illustrated in FIG. 2. The communication I/F is an interface that sets up radio communicative connection with a device which is a connection destination set in advance and performs radio communication.

In the following description, the CPU of the parking ECU 20 may be referred to as a "first CPU" and the CPU of the mobile terminal 90 may be referred to as a "second CPU."

The display device 25 is a multimedia display that is provided in a central part in the vehicle width direction of an instrument panel in a cabin of the vehicle VA. The display device 25 is a touch panel type display device. The display device 25 displays a warning message when an abnormality has occurred in the vehicle VA and a setting screen which will be described later (see FIG. 6A). The speaker 26 emits buzzer sound when an abnormality has occurred in the vehicle VA.

The comparison ECU 30 is connected to an ignition (IG) switch 32 and an ignition (IG) relay 34 such that data exchange is possible.

The IG switch 32 is also referred to as a "start switch" or a "ready switch." When a user operates the IG switch 32 at an OFF position, the IG switch 32 is changed from the OFF position to an ON position. When a user operates the IG switch 32 at the ON position, the IG switch 32 is changed from the ON position to the OFF position.

The IG relay 34 is a relay circuit that is connected to an ignition (IG) power supply 36. A state of the IG relay 34 includes a non-electrified state and an electrified state. The non-electrified state is a state in which electrical connection between the IG power supply 36 and an ECU (20, 40 to 80) other than the comparison ECU 30 is cut off and is a state in which electric power required for the vehicle VA to travel is not supplied. The comparison ECU 30 is supplied with electric power from a +B power supply (not illustrated), and is operating even when the IG power supply 36 is in the non-electrified state. The electrified state is a state in which the IG power supply 36 and the ECU (20, 40 to 80) are electrically connected and is a state in which electric power required for the vehicle VA to travel is supplied. In the following description, the state of the IG power supply 36 when the IG relay 34 is in the non-electrified state is referred to as a "power-off state" and the state of the IG power supply 36 when the IG relay 34 is in the electrified state is referred to as a "power-on state."

When the IG switch 32 is changed from the OFF position to the ON position, the comparison ECU 30 switches the state of the IG relay 34 from the non-electrified state to the electrified state and switches the IG power supply 36 from the OFF state to the ON state. On the other hand, when the IG switch 32 is changed from the ON position to the OFF position, the comparison ECU 30 switches the state of the IG relay 34 from the electrified state to the non-electrified state and switches the IG power supply 36 from the ON state to the OFF state.

When a power-off instruction is received from the parking ECU 20, the comparison ECU 30 switches the state of the IG relay 34 from the ON state to the OFF state.

The drive ECU 40 is connected to an accelerator pedal position sensor 42 and a drive source actuator 44 such that data exchange therebetween is possible.

The accelerator pedal position sensor 42 detects an accelerator pedal operation amount AP which is an amount of operation of an accelerator pedal 42a and generates a signal indicating the accelerator pedal operation amount AP. The drive ECU 40 acquires the accelerator pedal operation amount AP based on the signal generated by the accelerator pedal position sensor 42.

The drive source actuator 44 is connected to a drive source (such as an electric motor and an internal combustion engine) 44a that generates a driving force which is applied to the vehicle VA. The drive ECU 40 changes an operation state of the drive source 44a by controlling the drive source actuator 44, which can adjust the driving force applied to the vehicle VA. The drive ECU 40 controls the drive source actuator 44 such that the driving force applied to the vehicle VA increases as the accelerator pedal operation amount AP increases.

When the drive source 44a is in a non-operating state and the IG switch 32 is operated, the drive source 44a is started and the drive source 44a becomes an operating state. On the other hand, when the drive source 44a is in the operating state and the IG switch 32 is operated, the drive source 44a becomes the non-operating state.

The brake ECU 50 is connected to a brake pedal position sensor 52 and a brake actuator 54.

The brake pedal position sensor 52 detects a brake pedal operation amount BP which is an amount of operation of a brake pedal 52a and generates a signal indicating the brake pedal operation amount BP. The brake ECU 50 acquires the brake pedal operation amount BP based on the signal generated by the brake pedal position sensor 52.

The brake actuator 54 is an actuator that controls a friction brake mechanism 56 and includes a known hydraulic circuit. The friction brake mechanism 56 includes a brake disk 56a that is fixed to a wheel and a brake caliper 56b that is fixed to a vehicle body. The brake actuator 54 generates a frictional brake force by adjusting a hydraulic pressure supplied to a wheel cylinder built in the brake caliper 56b in accordance with an instruction from the brake ECU 50 and pressing a brake pad against the brake disk 56a with the hydraulic pressure. Accordingly, the brake ECU 50 can control the brake force of the vehicle VA by controlling the brake actuator 54.

The EPB ECU 60 is connected to a parking brake actuator (hereinafter referred to as a "PKB actuator") 62 such that data exchange therebetween is possible. The PKB actuator 62 generates a frictional brake force by pressing the brake pad to the brake disk 56a or pressing a shoe against a drum rotating along with the wheel when a drum brake is provided. The EPB ECU 60 can apply a parking brake force to the wheels using the PKB actuator 62 and can keep the vehicle VA in a stopped state. In the following description, braking of the vehicle VA based on operation of the PKB actuator 62 is simply referred to as "EPB."

The steering ECU 70 is connected to a steering angle sensor 72, a steering torque sensor 74, and a steering motor 76 such that data exchange therebetween is possible.

The steering angle sensor 72 detects a rotation angle of a steering wheel 72a from a neutral position as a steering angle θs and generates a signal indicating the steering angle θs. The steering ECU 70 acquires the steering angle θs based on the signal generated by the steering angle sensor 72.

The steering torque sensor 74 detects a steering torque Tr indicating a torque acting on a steering shaft 74a connected to the steering wheel 72a and generates a signal indicating the steering torque Tr. The steering ECU 70 acquires the steering torque Tr based on the signal generated by the steering torque sensor 74.

The steering motor 76 is assembled such that a torque can be transmitted to the "steering wheel 72a, the steering shaft 74a, and a steering mechanism 76a including a steering gear mechanism" of the vehicle VA. The steering motor 76 generates a torque corresponding to electric power which is supplied from a vehicle battery which is not illustrated. A direction, a magnitude, and the like of this electric power are controlled by the steering ECU 70. Because of the torque generated by the steering motor 76, a steering assist torque is generated and right and left turning wheels are steered (turned).

The steering ECU 70 controls the steering motor 76 such that the steering assist torque corresponding to the steering torque Tr is generated in a normal state.

The shift ECU 80 is connected to a shift position sensor 82. The shift position sensor 82 detects a position of a shift lever 82a (hereinafter also referred to as a "shift position SP"). In this example, the position of the shift lever 82a includes a parking range (P), a forward range (D), and a reverse range (R). The shift ECU 80 receives the position of the shift lever 82a from the shift position sensor 82 and controls a transmission (not illustrated) of the vehicle VA based on the received position.

More specifically, the shift ECU 80 controls the transmission such that a driving force is not transmitted to the driving wheels and the vehicle VA is mechanically locked to a stop position when the position of the shift lever 82a is "P." The shift ECU 80 controls the transmission such that a driving force for causing the vehicle VA to move forward is transmitted to the driving wheels when the position of the shift lever 82a is "D." The shift ECU 80 controls the transmission such that a driving force for causing the vehicle VA to move reversely is transmitted to the driving wheels when the position of the shift lever 82a is "R."

When a shift switch instruction is received from the parking ECU 20, the shift ECU 80 shifts the position of the shift lever 82a to a position based on the shift switch instruction and controls the transmission in accordance with the shift switch instruction.

Outline of Operations

Figure 3:
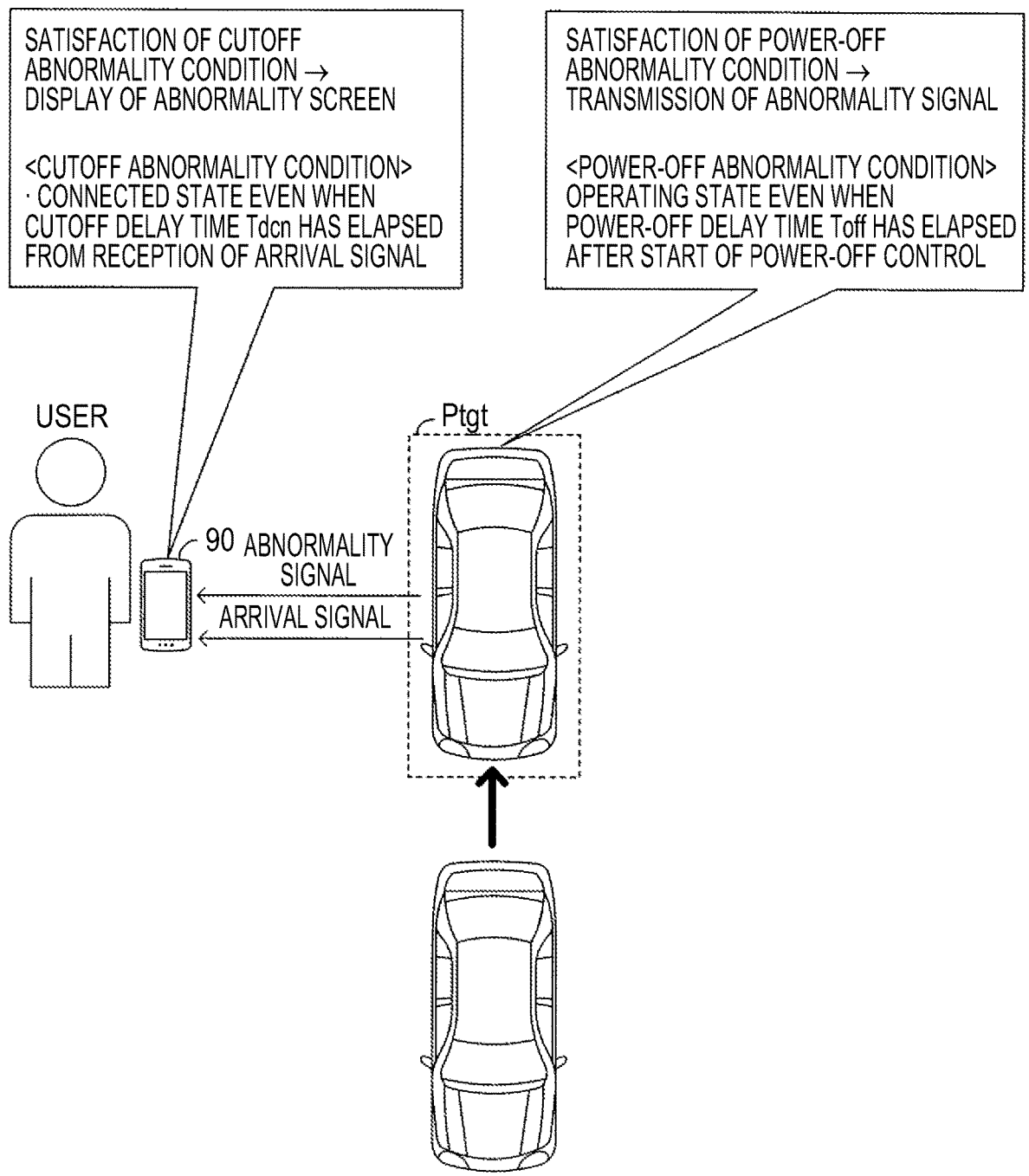
FIG. 3 is a diagram schematically illustrating operations according to the embodiment of the disclosure.

The outline of operations of the parking support device 10 will be described below with reference to FIG. 3. The parking ECU 20 of the parking support device 10 performs automatic parking control (remote automatic parking control) for causing the vehicle VA to travel to a predetermined target parking position Ptgt and causing the vehicle VA to stop at the target parking position Ptgt in response to an operation performed on the mobile terminal 90 by a user outside of the vehicle.

When the vehicle VA arrives at the target parking position Ptgt, the parking ECU 20 performs power-off control. The power-off control is control for switching the IG power supply 36 from the ON state to the OFF state. When the IG power supply 36 is in the OFF state, the ECUs (20, 40 to 80) are not supplied with electric power. Accordingly, the ECUs are in a state in which they are not operating (non-operating state).

When a power-off abnormality condition that it is operating (it is yet in the operating state) even when a predetermined power-off delay time Toff has elapsed after the power-off control has been started is satisfied, the parking ECU 20 determines that a power-off abnormality in which the IG power supply 36 is not switched to the OFF state has occurred. Then, the parking ECU 20 transmits an abnormality signal to the mobile terminal 90.

Figure 4A:
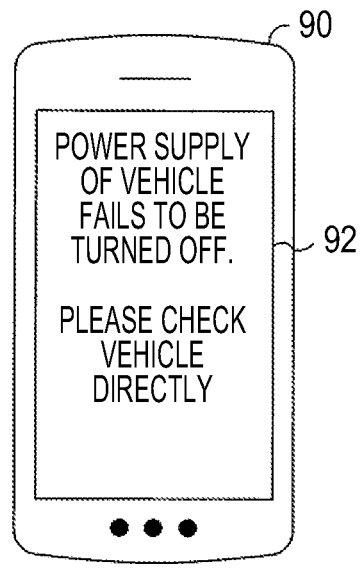
FIG. 4A is a diagram illustrating an abnormality screen which is displayed on the mobile terminal.

When an abnormality signal is received, the mobile terminal 90 displays an abnormality screen illustrated in FIG. 4A on the display device 92. In the abnormality screen, a message indicating that the IG power supply 36 has not been switched to the OFF state is displayed. Specifically, a message "Power supply of vehicle fails to be turned off Please directly ascertain vehicle" is displayed on the abnormality screen.

A user outside of the vehicle can see that the power-off abnormality has occurred from the outside of the vehicle by seeing the abnormality screen. The user having seen that the power-off abnormality has occurred can board the vehicle VA and take appropriate measures. With the parking support device 10, it is possible to decrease a likelihood that a user will be separated from the vehicle even if the IG power supply 36 is in the ON state and the vehicle VA will be left in a state in which the IG power supply 36 is in the ON state.

Figure 4B:
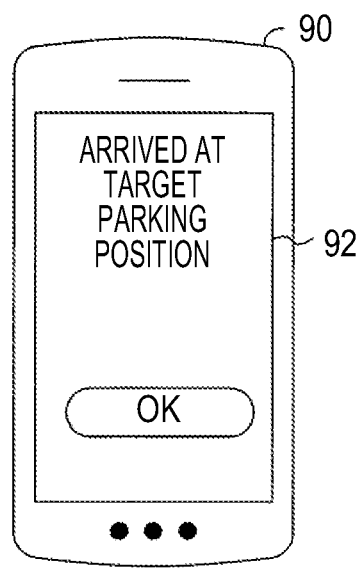
FIG. 4B is a diagram illustrating an arrival screen which is displayed on the mobile terminal.

The outline of operations of the mobile terminal 90 will be described below with reference to FIG. 3. When the vehicle VA have arrived at the target parking position Ptgt, the parking ECU 20 transmits an arrival signal to the mobile terminal 90. When the arrival signal is received, the mobile terminal 90 displays an arrival screen illustrated in FIG. 4B on the display device 92. In the arrival screen, a message indicating that the vehicle VA has arrived at the target parking position Ptgt is displayed. Specifically, a message "Vehicle has arrived at target parking position" is displayed on the arrival screen.

When the IG power supply 36 is switched to the OFF state, the "radio communicative connection set up between the mobile terminal 90 and the vehicle VA" is cut off Paying attention to this point, the mobile terminal 90 determines that a power-off abnormality has occurred when a cutoff abnormality condition that the radio communicative connection is not cut off even when a predetermined cutoff delay time Tdcn has elapsed after the arrival signal has been received is satisfied. Then, the mobile terminal 90 displays an abnormality screen illustrated in FIG. 4A on the display device 92.

Accordingly, it is possible to notify a user that the power-off abnormality has occurred even when the mobile terminal 90 cannot receive an abnormality signal.

Operation Example

Figure 5:
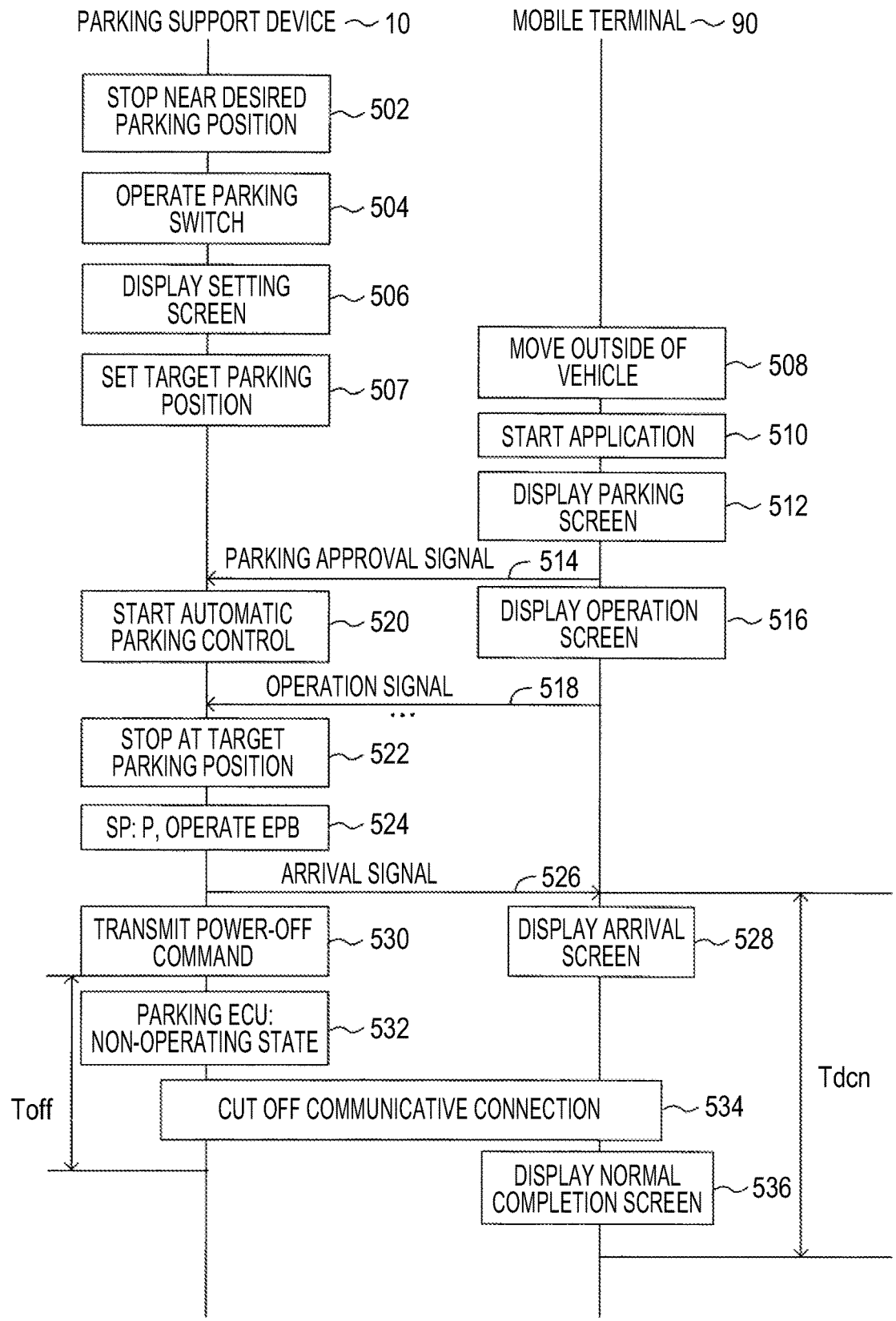
FIG. 5 is a sequence diagram illustrating a first operation example of the parking support device and the mobile terminal.

An example in which the IG power supply 36 normally becomes the OFF state and the radio communicative connection is cut off before the cutoff delay time Tdcn elapses after the mobile terminal 90 has received an arrival signal will be described below with reference to FIG. 5.

Figure 6A:
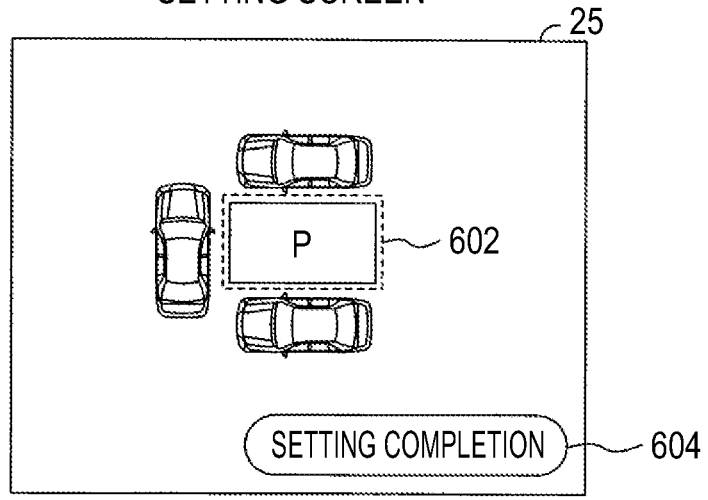
FIG. 6A is a diagram illustrating a setting screen which is displayed on a display device of a vehicle.

When a user stops the vehicle VA in the vicinity of a position at which the vehicle VA is desired to park (502) and operates a parking switch (not illustrated) (504), the parking support device 10 displays a setting screen illustrated in FIG. 6A on the display device 25 (506). The parking switch is provided in the vicinity of the steering wheel 72a.

In the setting screen, an overhead image when the surroundings centered on the vehicle VA are viewed from just above the vehicle VA is displayed. The overhead image is generated based on image data acquired by the cameras 23. In the overhead image, a parking space P which is a space in which the vehicle VA can park is displayed, and a target parking frame 602 (indicated by a dotted line in FIG. 6A) is displayed to surround the parking space P. In the setting screen, a setting completion button 604 is also displayed. When the vehicle speed Vs is equal to or less than a predetermined threshold vehicle speed Vsth, the parking support device 10 searches for an available parking space based on the image data acquired by the cameras 23 and a position of a stationary object detected by the clearance sonars 22.

When there is a plurality of parking spaces P, the target parking frame 602 is displayed to surround a parking space P closest to the vehicle VA. The user can move the target parking frame 602 to an arbitrary position by long pressing the target parking frame 602. When it is ascertained that the target parking frame 602 is located at the position at which the vehicle VA is desired to park, the user operates the setting completion button 604. When the setting completion button 604 is operated, the parking support device 10 sets the position corresponding to the target parking frame 602 as the target parking position Ptgt (507).

Figure 6B:
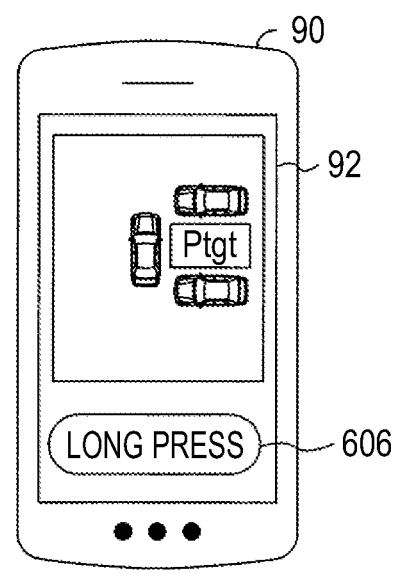
FIG. 6B is a diagram illustrating an ascertainment screen which is displayed on the mobile terminal.

After the setting completion button 604 has been operated, the user moves out of the vehicle with the mobile terminal 90 (508) and starts an automatic parking application which is installed in the mobile terminal 90 (510). When the automatic parking application is started, the mobile terminal 90 communicates with the parking support device 10 and acquires parking position information including the "overhead image and the target parking position Ptgt." Then, the mobile terminal 90 displays an ascertainment screen illustrated in FIG. 6B on the display device 92 based on the parking position information (512).

In the ascertainment screen, the "target parking position Ptgt set by the parking support device 10" is displayed over the overhead image. In the ascertainment screen, a long-press button 606 is displayed.

Figure 6C:
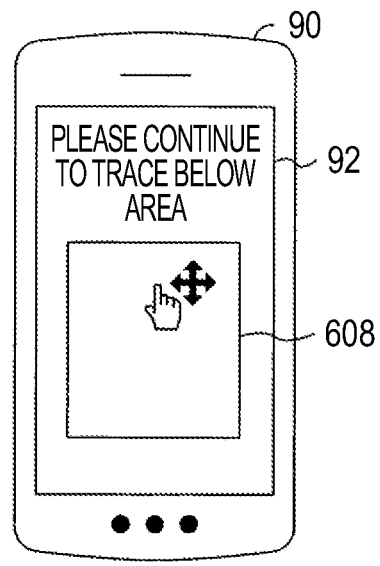
FIG. 6C is a diagram illustrating an operation screen which is displayed on the mobile terminal.

When the user approves of parking of the vehicle VA at the target parking position Ptgt, the user long presses the long-press button 606 displayed on the setting screen. When the long-press button 606 is long pressed, the mobile terminal 90 transmits a parking approval signal to the parking support device 10 (514) and displays an operation screen illustrated in FIG. 6C on the display device 92 (516).

In the operation screen, an operation area 608 and a "message for promoting an operation on the operation area 608" are displayed. When a touch position in the operation area 608 changes continuously by allowing the user to trace the operation area 608 with a finger, the mobile terminal 90 continue to transmit an operation signal to the parking support device 10 (518). The operation signal is also referred to as an "instruction signal."

On the other hand, when the parking approval signal transmitted from the mobile terminal 90 is received, the parking support device 10 acquires a target route to the target parking position Ptgt based on the image data and the position of a stationary object and starts automatic parking control (516).

When automatic parking control is started once, the parking support device 10 causes the vehicle VA to travel continuously along the target route until the vehicle VA reaches the target parking position Ptgt as long as an operation signal is received. When the vehicle VA arrives at a deceleration start position which is a position in a predetermined distance before the target parking position Ptgt along the target route, the parking support device 10 starts deceleration of the vehicle VA and causes the vehicle VA to stop at the target parking position Ptgt (522).

When the vehicle VA stops at the target parking position Ptgt, the parking support device 10 locates the shift position SP at "P" and operates the EPB (524). Then, the parking support device 10 transmits an arrival signal to the mobile terminal 90 (526). When the arrival signal is received, the mobile terminal 90 displays an arrival screen illustrated in FIG. 4B on the display device 92 (528).

After the arrival signal has been transmitted, the parking support device 10 transmits a power-off instruction for switching the IG power supply 36 to the OFF state to the comparison ECU 30 (in other words, starts power-off control) (530).

Figure 6D:
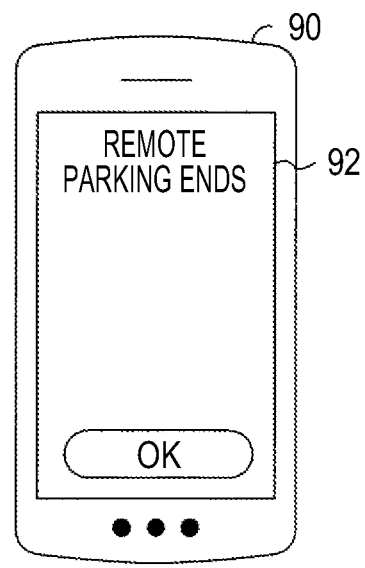
FIG. 6D is a diagram illustrating a normal completion screen which is displayed on the mobile terminal.

Until the power-off delay time Toff elapses after the power-off instruction has been transmitted, the parking ECU 20 is switched to the non-operating state (532) and the radio communicative connection is cut off (534). In the example illustrated in FIG. 5, since the radio communication connection is cut off before the cutoff delay time Tdcn elapses after the mobile terminal 90 has received an arrival signal, the mobile terminal 90 displays a normal completion screen illustrated in FIG. 6D on the display device 92 (536). In the normal completion screen, a message indicating that automatic parking control has been normally completed (a message "Automatic parking ends") is displayed.

Figure 7:
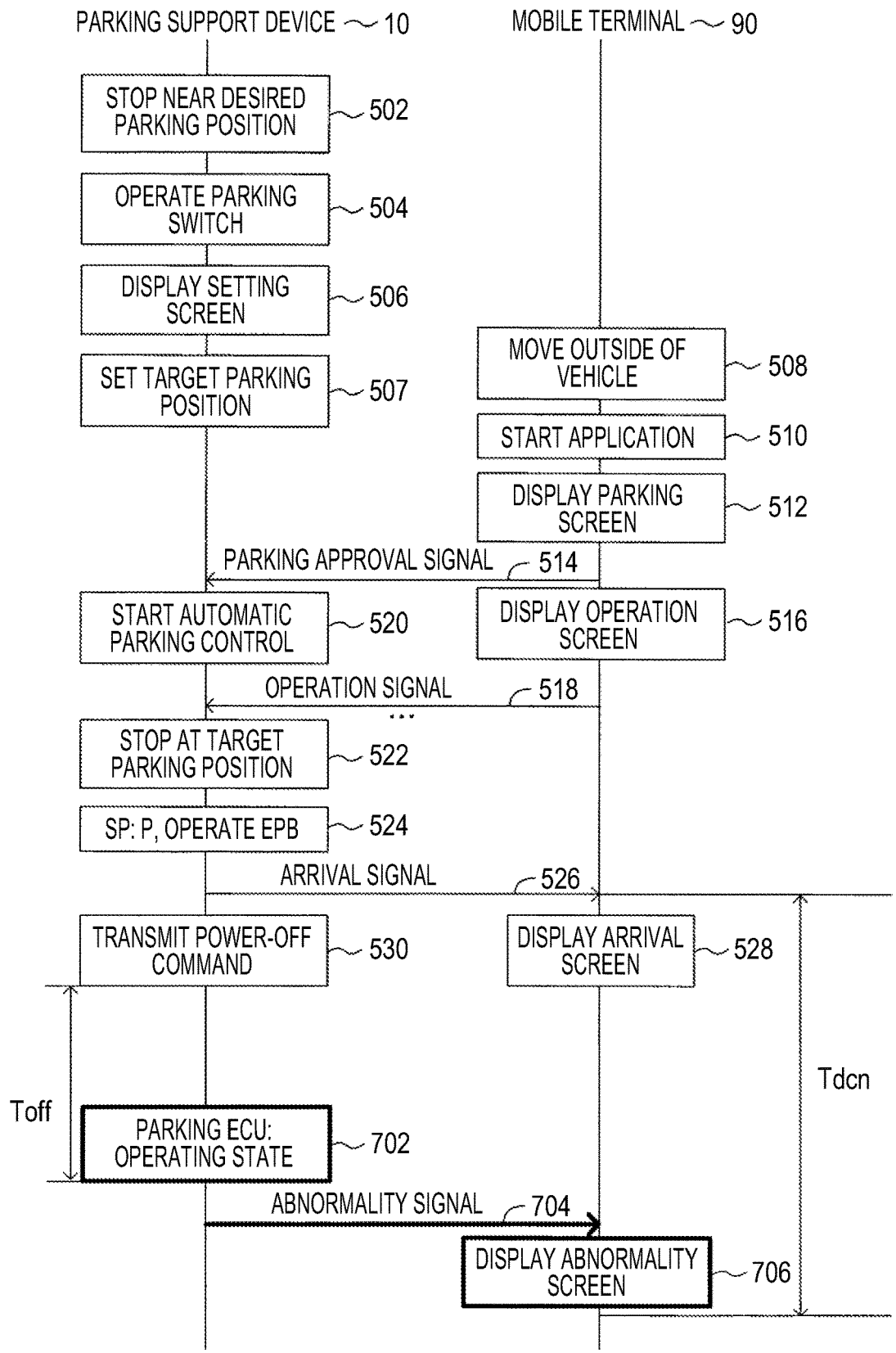
FIG. 7 is a sequence diagram illustrating a second operation example of the parking support device and the mobile terminal.

An example in which the parking ECU 20 is in the operating state when the power-off delay time Toff elapsed after the power-off instruction has been transmitted to the comparison ECU 30 will be described below with reference to FIG. 7. In the sequence diagram illustrated in FIG. 7, the same processes as in the sequence diagram illustrated in FIG. 5 will be referred to by the same reference signs and description thereof will be omitted.

At a time point at which the power-off delay time Toff has elapsed after the parking ECU 20 has transmitted the power-off instruction to the comparison ECU 30 (530 in FIG. 7), the parking ECU 20 is in the operating state (702) and thus transmits an abnormality signal to the mobile terminal 90 (704). When the abnormality signal is received, the mobile terminal 90 displays an abnormality screen illustrated in FIG. 4A on the display device 92 (706).

Figure 8:
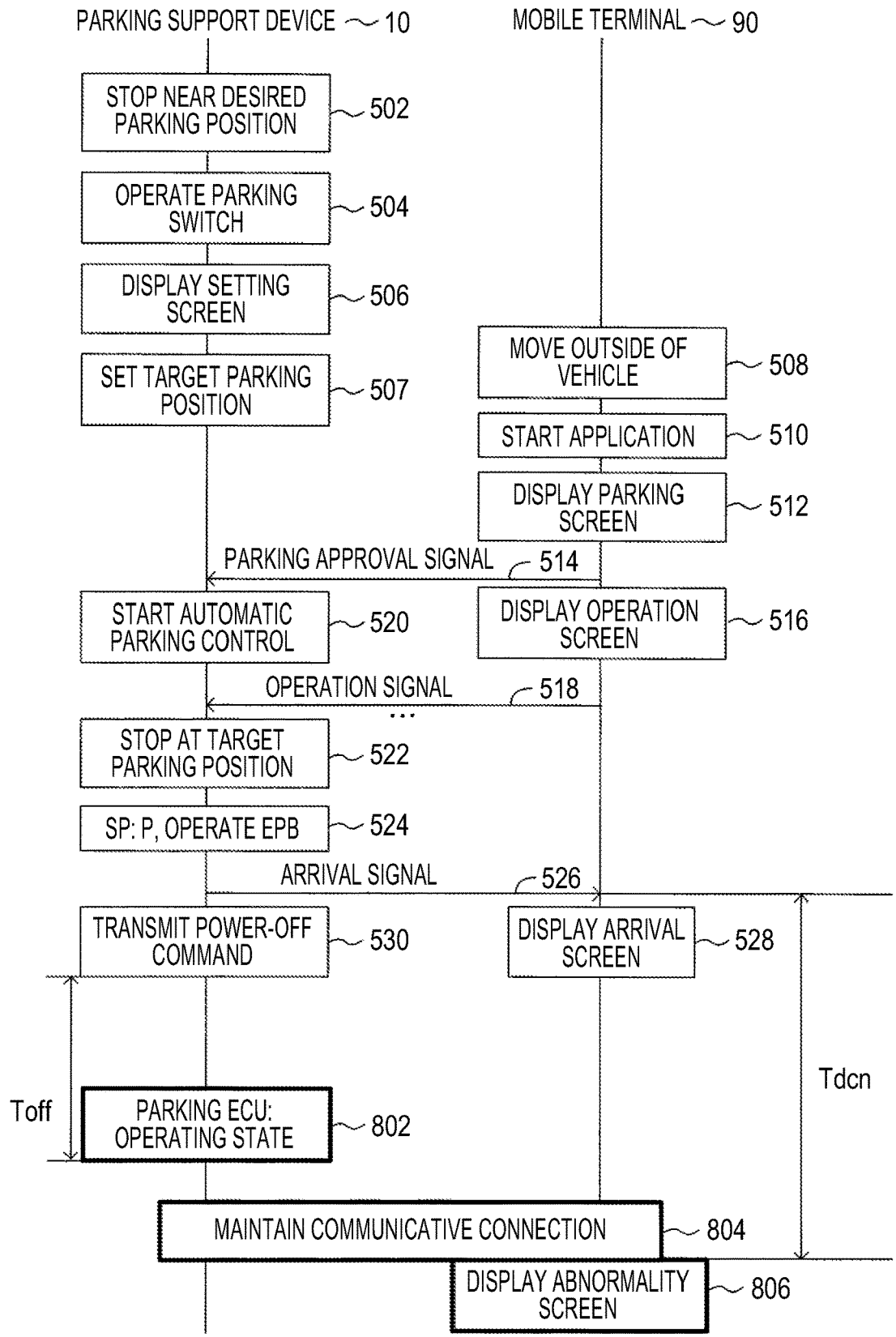
FIG. 8 is a sequence diagram illustrating a third operation example of the parking support device and the mobile terminal.

An example in which radio communicative connection is not cut off even when the cutoff delay time Tdcn elapsed after the mobile terminal 90 has received an arrival signal will be described below with reference to FIG. 8. In the sequence diagram illustrated in FIG. 8, the same processes as in the sequence diagram illustrated in FIG. 5 will be referred to by the same reference signs and description thereof will be omitted.

At a time point at which the power-off delay time Toff has elapsed after the parking ECU 20 has transmitted a power-off instruction to the comparison ECU 30 (530 in FIG. 8), the parking ECU 20 is in the operating state (802). However, the parking ECU 20 may not be able to transmit an abnormality signal due to occurrence of a certain abnormality. In this case, the mobile terminal 90 displays the abnormality screen illustrated in FIG. 4A on the display device 92 (806) when an abnormality signal is not received and the radio communicative connection is not cut off at a time point at which the cutoff delay time Tdcn has elapsed after the arrival signal has been received (804).

Specific Operations
Start Determination Routine

The CPU of the parking ECU 20 (a "first CPU" in the following description refers to the CPU of the parking ECU 20 unless otherwise mentioned) performs a routine (a start determination routine) of the flowchart illustrated in FIG. 9 whenever a predetermined time elapses.

Figure 9:
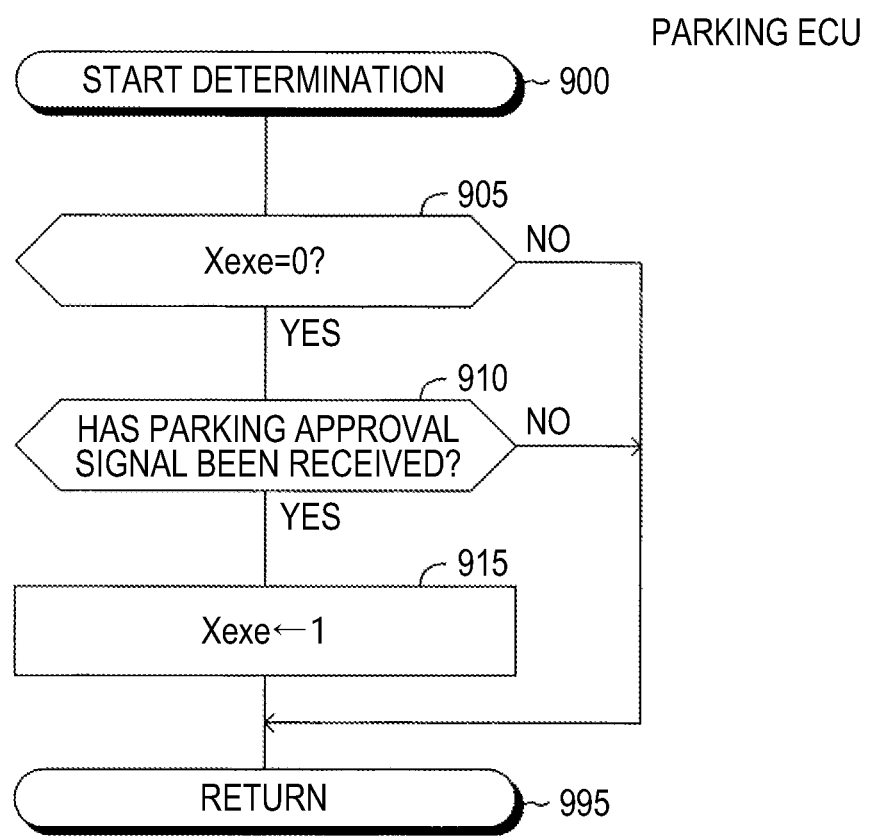
FIG. 9 is a flowchart illustrating a start determination routine which is performed by a CPU of a parking ECU illustrated in FIG. 1.

Accordingly, at a predetermined timing, the first CPU starts the routine from Step 900 in FIG. 9 and determines whether a value of an execution flag Xexe is "0" in Step 905. The value of the execution flag Xexe is set to "1" when the first CPU receives a parking approval signal transmitted from the mobile terminal 90 (see Step 915) and is set to "0" when the vehicle VA arrives at the target parking position Ptgt (see Step 1055 in FIG. 10). In an initial routine which is performed by the first CPU when the IG switch 32 is switched from the OFF position to the ON position, the value of the execution flag Xexe is set to "0."

When the value of the execution flag Xexe is "0," the first CPU determines "YES" in Step 905 and causes the routine to proceed to Step 910. In Step 910, the first CPU determines whether the parking approval signal transmitted from the mobile terminal 90 is received.

When the first CPU does not receive a parking approval signal, the first CPU determines "NO" in Step 910 and then temporarily ends the routine in Step 995.

When the first CPU receives a parking approval signal, the first CPU determines "YES" in Step 910 and causes the routine to proceed to Step 915. In Step 915, the first CPU sets the value of the execution flag Xexe to "1" and then temporarily ends the routine in Step 995.

When the value of the execution flag Xexe is "1" when the first CPU causes the routine to proceed to Step 905, the first CPU determines "NO" in Step 905 and then temporarily ends the routine in Step 995.

Automatic Parking Control Routine

Figure 10:
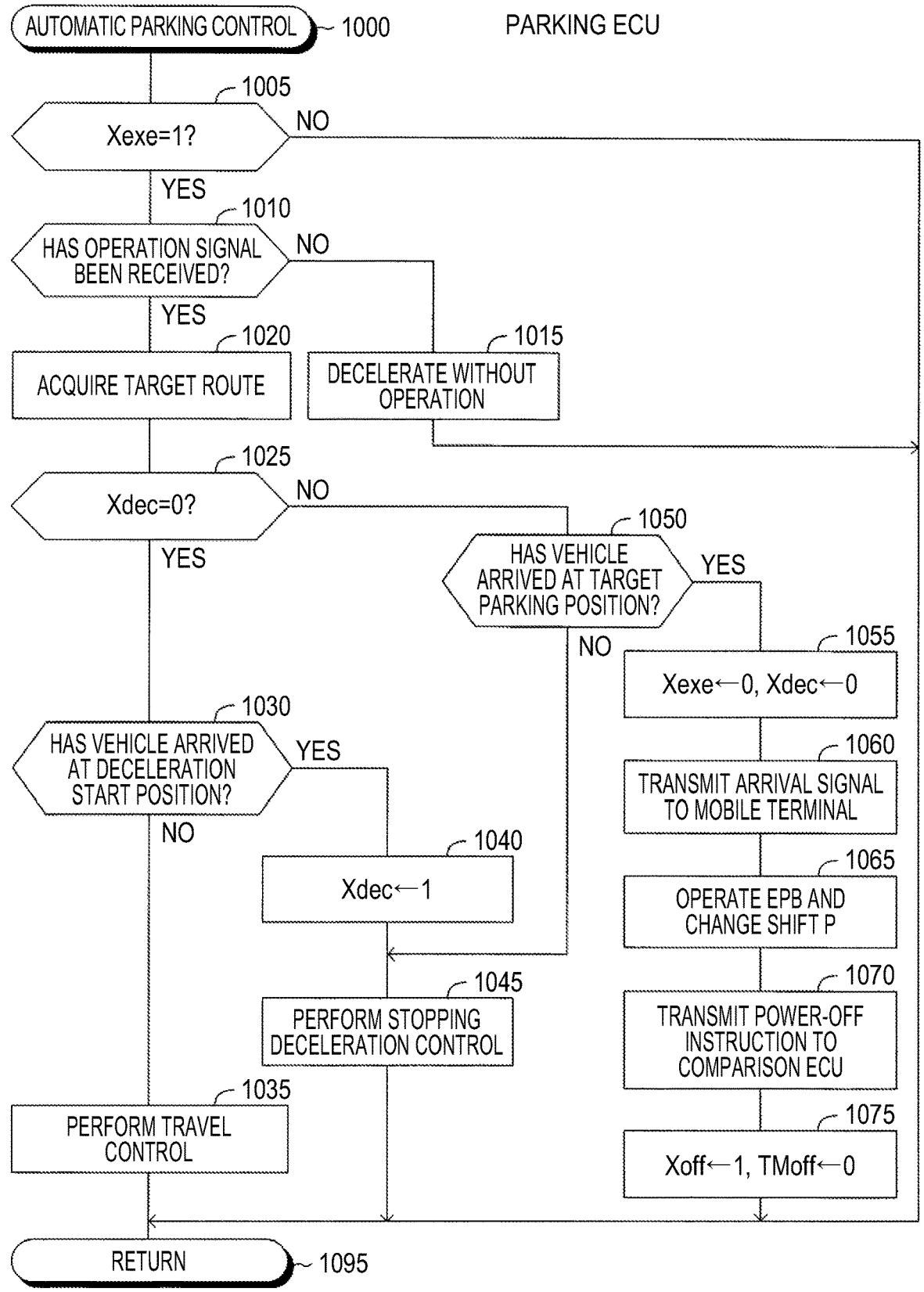
FIG. 10 is a flowchart illustrating an automatic parking control routine which is performed by the CPU of the parking ECU illustrated in FIG. 1.

The first CPU performs a routine (an automatic parking control routine) of the flowchart illustrated in FIG. 10 whenever a predetermined time elapses.

Accordingly, at a predetermined timing, the first CPU starts the routine from Step 1000 in FIG. 10 and determines whether the value of the execution flag Xexe is "1" in Step 1005.

When the value of the execution flag Xexe is "0," the first CPU determines "NO" in Step 1005 and then temporarily ends the routine in Step 1095.

When the value of the execution flag Xexe is "1," the first CPU determines "YES" in Step 1005 and causes the routine to proceed to Step 1010. In Step 1010, the first CPU determines whether an operation signal transmitted from the mobile terminal 90 is received.

When the first CPU does not receive an operation signal, the first CPU determines "NO" in Step 1010 and transmits an "acceleration/deceleration instruction including a preset non-operated acceleration Gnt (<0) as a target acceleration Gtgt" to the drive ECU 40 and the brake ECU 50. Thereafter, the first CPU temporarily ends the routine in Step 1095.

When the acceleration/deceleration instruction is received, the drive ECU 40 controls the drive source actuator 44 such that the acceleration G of the vehicle VA reaches the target acceleration Gtgt included in the acceleration/deceleration instruction. Similarly, when the acceleration/deceleration instruction is received, the brake ECU 50 controls the brake actuator 54 such that the acceleration G of the vehicle VA reaches the target acceleration Gtgt included in the acceleration/deceleration instruction. The acceleration G is acquired by differentiating the vehicle speed Vs with respect to time.

When the first CPU receives the operation signal, the first CPU determines "YES" in Step 1010 and sequentially performs Step 1020 and Step 1025.

Step 1020: The first CPU acquires a target route to the target parking position Ptgt. In Step 1020, the first CPU also acquires a deceleration start position which is a position in a predetermined distance before the target parking position Ptgt along the target route.

Step 1025: The first CPU determines whether a value of a deceleration flag Xdec is "0."

The value of the deceleration flag Xdec is set to "1" when the vehicle VA arrives at the deceleration start position (see Step 1040), and is set to "0" when the vehicle VA arrives at the target parking position Ptgt (see Step 1055). The value of the deceleration flag Xdec is set to "0" in the initial routine.

When the value of the deceleration flag Xdec is "0," the first CPU determines "YES" in Step 1025 and causes the routine to proceed to Step 1030. In Step 1030, the first CPU determines whether the vehicle VA arrives at the deceleration start position based on image data and a detection signal from the wheel speed sensors 21. Specifically, the first CPU acquires a travel distance by which the vehicle VA has traveled in a period until this routine is currently performed after the routine has been previously performed based on the detection signal acquired in the period. The first CPU also acquires a residual distance to the deceleration start position acquired based on the image data. When the travel distance matches the residual distance acquired when this routine is performed, the first CPU determines that the vehicle VA has arrived at the deceleration start position.

When the vehicle VA has not arrived at the deceleration start position, the first CPU determines "NO" in Step 1030 and causes the routine to proceed to Step 1035. In Step 1035, the first CPU performs travel control such that the vehicle VA travels at a preset target vehicle speed Vst along the target route. Thereafter, the first CPU temporarily ends the routine in Step 1095.

Travel control will be specifically described below. The first CPU calculates a target acceleration Gtgt for matching the vehicle speed Vs with a predetermined target vehicle speed Vst. The first CPU transmits an acceleration/deceleration instruction including the target acceleration Gtgt to the drive ECU 40 and the brake ECU 50. The first CPU calculates a target steering angle θtgt for allowing the vehicle VA to travel along the target route and transmits a steering instruction including the target steering angle θtgt to the steering ECU 70. The steering ECU 70 controls the steering motor 76 such that the steering angle θs matches the "target steering angle θtgt included in the received steering instruction."

When the vehicle VA arrives at the deceleration start position when the first CPU performs Step 1030, the first CPU determines "YES" in Step 1030 and sequentially performs Step 1040 and Step 1045.

Step 1040: The first CPU sets the value of the deceleration flag Xdec to "1."

Step 1045: The first CPU performs stopping deceleration control for causing the vehicle VA to stop at a target stop position. Thereafter, the first CPU temporarily ends the routine in Step 1095.

Stopping deceleration control will be specifically described below. The first CPU transmits an "acceleration/deceleration instruction including a preset stopping acceleration Gst (<0) as a target acceleration Gtgt" to the drive ECU 40 and the brake ECU 50. In the stopping deceleration control, the first CPU also transmits a steering instruction including a target steering angle θtgt for allowing the vehicle VA to travel along the target route to the steering ECU 60.

When the value of the deceleration flag Xdec is "1" when the first CPU performs Step 1025, the first CPU determines "NO" in Step 1025 and causes the routine to proceed to Step 1050. In Step 1050, the first CPU determines whether the vehicle VA has arrived at the target parking position Ptgt. Determination of whether the vehicle VA has arrived at the target parking position Ptgt can be performed using the same method as determination of whether the vehicle VA has arrived at the deceleration start position.

When the vehicle VA has not arrived at the target parking position Ptgt, the first CPU determines "NO" in Step 1050 and performs stopping deceleration control in Step 1045. Thereafter, the first CPU temporarily ends the routine in Step 1095.

When the vehicle VA has arrived at the target parking position Ptgt, the first CPU determines "YES" in Step 1050 and sequentially performs Step 1055 to Step 1075.

Step 1055: The first CPU sets the values of the execution flag Xexe and the deceleration flag Xdec to "0."

Step 1060: The first CPU transmits an arrival signal to the mobile terminal 90.

Step 1065: The first CPU operates the EPB and shifts the position of the shift lever 82a to "P."

Step 1070: The first CPU transmits a power-off instruction to the comparison ECU 30. When the power-off instruction is received, the comparison ECU 30 changes the IG power supply 36 to the OFF state by changing the IG relay 34 to the non-electrified state.

Step 1075: The first CPU sets a value of a power-off determination flag Xoff to "1" and sets a power-off determination timer TMoff to "0." Thereafter, the first CPU temporarily ends the routine in Step 1095.

The value of the power-off determination flag Xoff is set to "1" when the first CPU has transmitted the power-off instruction and is set to "0" in the initial routine. The power-off determination timer TMoff is a timer for counting time elapsing after the first CPU has transmitted the power-off instruction.

Thereafter, the first CPU temporarily ends the routine in Step 1095.

Power-Off Abnormality Determination Routine

Figure 11:
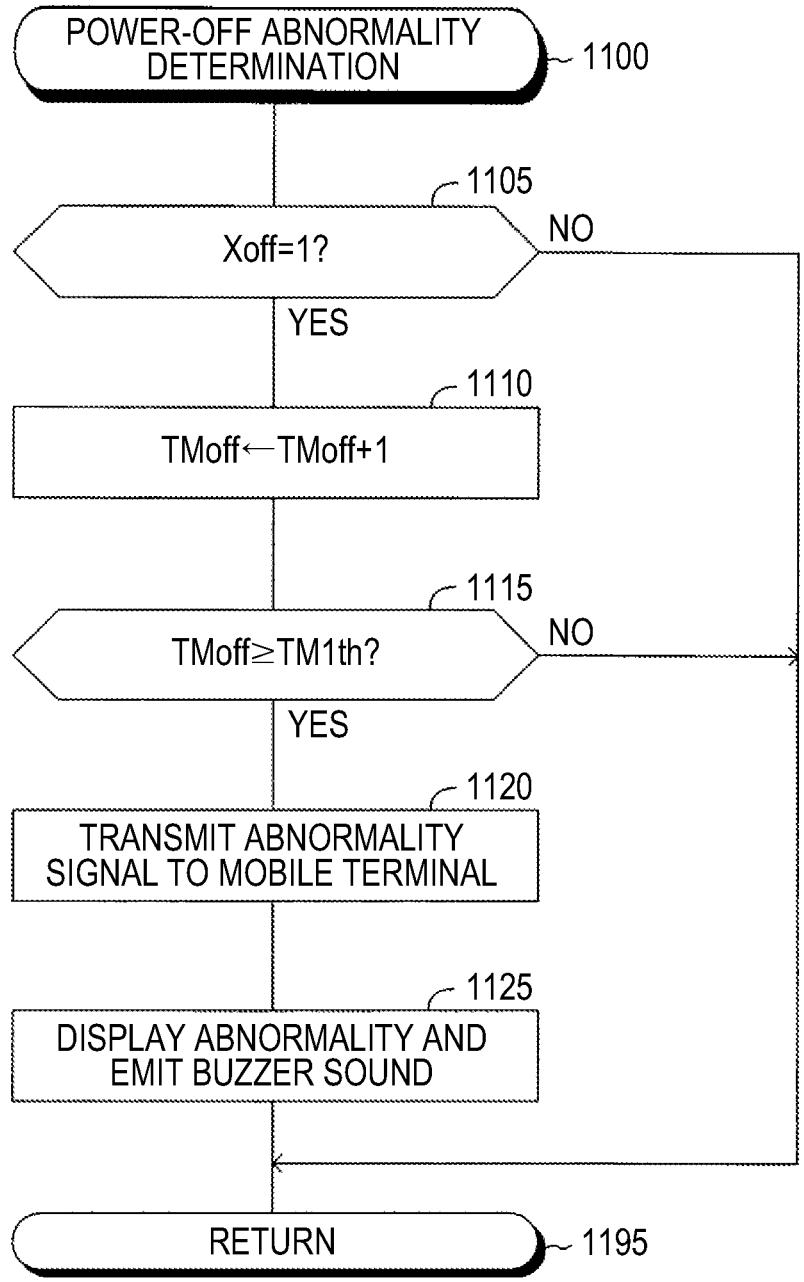
FIG. 11 is a flowchart illustrating a power-off abnormality determination routine which is performed by the CPU of the parking ECU illustrated in FIG. 1.

The first CPU performs a routine (a power-off abnormality determination routine) of the flowchart illustrated in FIG. 11 whenever a predetermined time elapses.

Accordingly, at a predetermined timing, the first CPU starts the routine from Step 1100 in FIG. 11 and determines whether the value of the power-off determination flag Xoff is "1" in Step 1105.

When the value of the power-off determination flag Xoff is "0," the first CPU determines "NO" in Step 1105 and then temporarily ends the routine in Step 1195.

When the value of the power-off determination flag Xoff is "1," the first CPU determines "YES" in Step 1105 and sequentially performs Step 1110 and Step 1115.

Step 1110: The first CPU adds "1" to the power-off determination timer TMoff.

Step 1115: The first CPU determines whether the power-off determination timer TMoff is equal to or greater than a predetermined threshold value TM1$th$. The threshold value TM1$th$ is set in advance such that the value of the power-off determination timer TMoff reaches the threshold value TM1$th$ at a time point at which the power-off delay time Toff has elapsed after the power-off instruction has been transmitted.

When the power-off determination timer TMoff is less than the threshold value TM1$th$, the first CPU determines "NO" in Step 1115 and then temporarily ends the routine in Step 1195.

When the power-off determination timer TMoff is equal to or greater than the threshold value TM1$th$, the first CPU determines "YES" in Step 1115 and sequentially performs Step 1120 and Step 1125.

Step 1120: The first CPU transmits an abnormality signal to the mobile terminal 90.

Step 1125: The first CPU performs abnormality notification by displaying an image indicating that a power-off abnormality has occurred on the display device 25 and causes the speaker 26 to emit buzzer sound.

Thereafter, the first CPU temporarily ends the routine in Step 1195.

Reception Determination Routine

The CPU of the mobile terminal 90 (a "second CPU" in the following description refers to the CPU of the mobile terminal 90 unless otherwise mentioned) performs a routine (a reception determination routine) of the flowchart illustrated in FIG. 12 whenever a predetermined time elapses.

Figure 12:
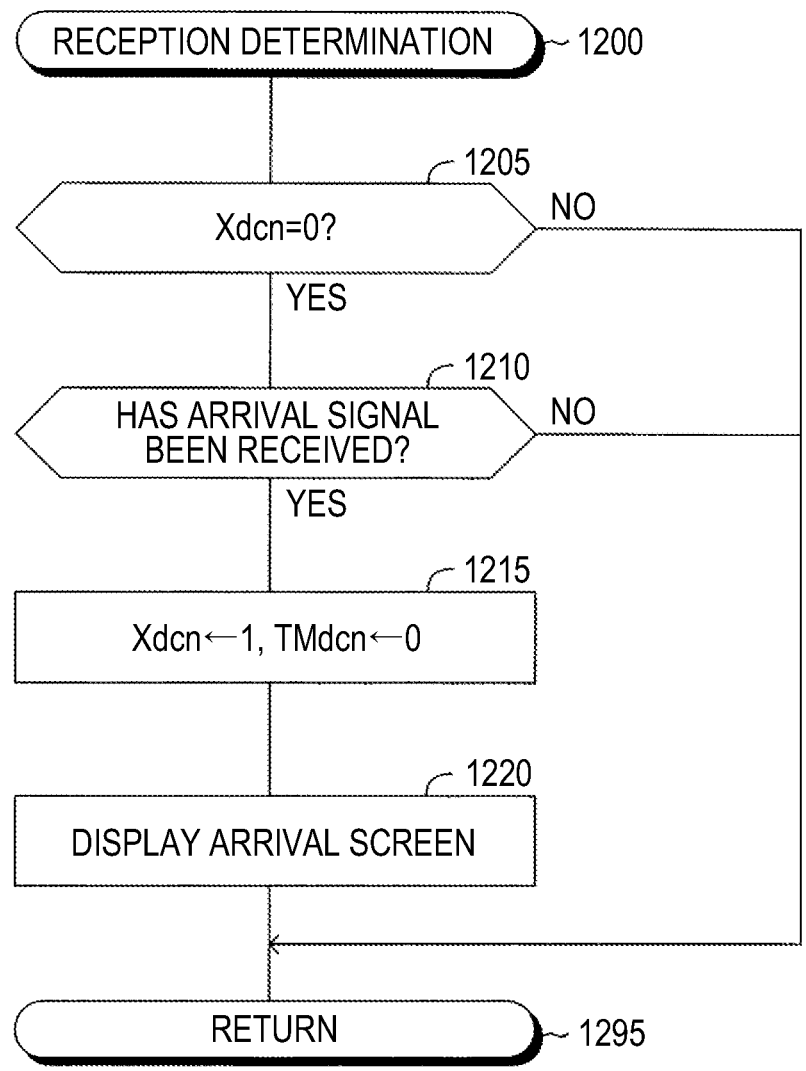
FIG. 12 is a flowchart illustrating a reception determination routine which is performed by a CPU of the mobile terminal illustrated in FIG. 2.

Accordingly, at a predetermined timing, the second CPU starts the routine from Step 1200 in FIG. 12 and determines whether a value of a cutoff determination flag Xdcn is "0" in Step 1205. The value of the cutoff determination flag Xdcn is set to "1" when the mobile terminal 90 receives an arrival signal (see Step 1215) and is set to "0" when an abnormality screen or a normal completion screen is displayed (see Step 1335 in FIG. 13). The second CPU sets the value of the cutoff determination flag Xdcn to "0" when an automatic parking application starts.

When the value of the cutoff determination flag Xdcn is "0," the second CPU determines "YES" in Step 1205 and causes the routine to proceed to Step 1210. In Step 1210, the second CPU determines whether the mobile terminal 90 has received an arrival signal.

When the mobile terminal 90 has not received an arrival signal, the second CPU determines "NO" in Step 1210 and then temporarily ends the routine in Step 1295.

When the mobile terminal 90 has received an arrival signal, the second CPU determines "YES" in Step 1210 and sequentially performs Step 1215 and Step 1220.

Step 1215: The second CPU sets the value of the cutoff determination flag Xdcn to "1" and sets the value of the cutoff determination timer TMdcn to "0."

The cutoff determination timer TMdcn is a timer for counting time elapsing after the mobile terminal 90 has received an arrival signal.

Step 1220: The second CPU displays an arrival screen on the display device 92.

Thereafter, the second CPU temporarily ends the routine in Step 1295.

Cutoff Abnormality Determination Routine

The CPU of the mobile terminal 90 (a "second CPU" in the following description refers to the CPU of the mobile terminal 90 unless otherwise mentioned) performs a routine (a cutoff abnormality determination routine) of the flowchart illustrated in FIG. 13 whenever a predetermined time elapses.

Figure 13:
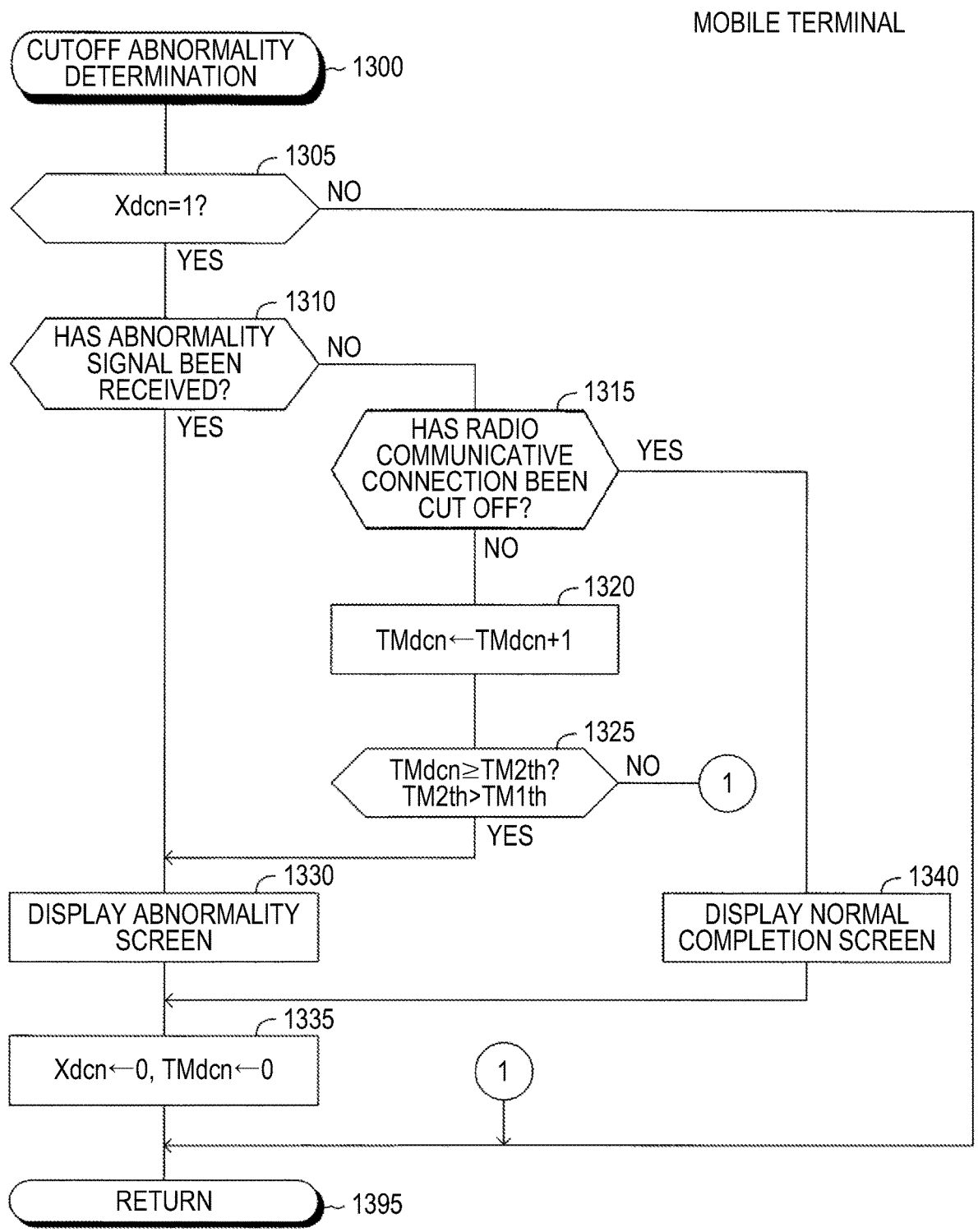
FIG. 13 is a flowchart illustrating a cutoff abnormality determination routine which is performed by a CPU of the mobile terminal illustrated in FIG. 2.

Accordingly, at a predetermined timing, the second CPU starts the routine from Step 1300 in FIG. 13 and determines whether the value of the cutoff determination flag Xdcn is "1" in Step 1305.

When the value of the cutoff determination flag Xdcn is "0," the second CPU determines "NO" in Step 1305 and temporarily ends the routine in Step 1395.

When the value of the cutoff determination flag Xdcn is "1," the second CPU determines "YES" in Step 1305 and causes the routine to proceed to Step 1310. In Step 1310, the second CPU determines whether the mobile terminal 90 has received an abnormality signal.

When the mobile terminal 90 has not received an arrival signal, the second CPU determines "NO" in Step 1310 and then performs Step 1315. In Step 1315, the second CPU determines whether radio communicative connection set up between the vehicle VA and the mobile terminal 90 has been cut off.

Step 1315 will be described below in detail. After radio communicative connection has been set up, the vehicle VA and the mobile terminal 90 transmit a normal operating signal through the radio communicative connection whenever a predetermined time elapses. The second CPU determines that the radio communicative connection has been cut off when a period of time in which a normal operating signal is not received from the vehicle VA is equal to or greater than a predetermined threshold cutoff time.

When the radio communicative connection has not been cut off, the second CPU determines "NO" in Step 1315 and sequentially performs Step 1320 and Step 1325.

Step 1315: The second CPU adds "1" to the cutoff determination timer TMdcn.

Step 1320: The second CPU determines whether the cutoff determination timer TMdcn is equal to or greater than a predetermined threshold value TM2$th$.

The threshold value TM2$th$ is set in advance to a value greater than the threshold value TM1$th$. The threshold value TM2$th$ is set in advance such that the value of the cutoff determination timer TMdcn reaches the threshold value TM2$th$ at a time point at which the cutoff delay time Tdcn has elapsed after an arrival signal has been received.

When the cutoff determination timer TMdcn is less than the threshold value TM2$th$, the second CPU determines "NO" in Step 1325 and temporarily ends the routine in Step 1395.

When the cutoff determination timer TMdcn is equal to or greater than the threshold value TM2$th$, the second CPU determines "YES" in Step 1325 and sequentially performs Step 1330 and Step 1335.

Step 1330: The second CPU displays an abnormality screen on the display device 92.

Step 1335: The second CPU sets the value of the cutoff determination flag Xdcn to "0" and sets the value of the cutoff determination timer TMdcn to "0."

Thereafter, the second CPU temporarily ends the routine in Step 1395.

On the other hand, when the mobile terminal 90 has received an abnormality signal when the second CPU performs Step 1310, the second CPU determines "YES" in Step 1310, displays an abnormality screen in Step 1330, and performs Step 1335. Thereafter, the second CPU temporarily ends the routine in Step 1395.

On the other hand, when the radio communicative connection is cut off when the second CPU performs Step 1315, the second CPU determines "YES" in Step 1315 and causes the routine to proceed to Step 1340. In Step 1340, the second CPU displays a normal completion screen on the display device 92 and temporarily ends the routine in Step 1395.

According to this embodiment, when the parking ECU 20 is operating still when the power-off delay time Toff has elapsed after the parking ECU 20 has transmitted a power-off instruction to the comparison ECU 30, the mobile terminal 90 displays an abnormality screen. Accordingly, it is possible to notify a user outside of the vehicle that a power-off abnormality has occurred.

When the radio communicative connection is not cut off even if the cutoff delay time Tdcn has elapsed after the mobile terminal 90 has received an arrival signal, the mobile terminal 90 displays an abnormality screen. Accordingly, even when the parking ECU 20 cannot transmit an abnormality signal due to an abnormality occurring in the parking ECU 20, it is possible to notify a user outside of the vehicle that a power-off abnormality has occurred.

The disclosure is not limited to the aforementioned embodiment, and various modified examples of the disclosure can be employed.

First Modified Example

In this modified example, the parking ECU 20 identifies a reason for a power-off abnormality and transmits an abnormality signal to the mobile terminal 90 in a mode in which the reason for the power-off abnormality can be identified. The mobile terminal 90 displays an abnormality screen in a mode in which the reason for the power-off abnormality can be identified when an abnormality signal is received. According to this modified example, a user can see the reason for the power-off abnormality in addition to occurrence of the power-off abnormality. Accordingly, the user can take measures corresponding to the reason for the power-off abnormality.

In this modified example, the parking ECU 20 identifies first to third reasons described below.

First reason: an abnormality of the comparison ECU 30
Second reason: an abnormality of the CAN
Third reason: an abnormality of an IG power supply system The ECUs 20 to 80 transmit a normal operating signal via the CAN whenever a predetermined transmission time elapses.

The parking ECU 20 identifies a power-off abnormality with the first reason as occurring when a "first abnormality condition that the normal operating signals have been received from the ECUs 40 to 80 other than the comparison ECU 30 and the normal operating signal has not been received from the comparison ECU 30" is satisfied.

The parking ECU 20 identifies a power-off abnormality with the second reason as occurring when a "second abnormality condition that the normal operating signals have not been received from a plurality of ECUs 30 to 80 including the comparison ECU 30" is satisfied.

The parking ECU 20 identifies a power-off abnormality with the third reason as occurring when a "third abnormality condition that the normal operating signals have been received from a plurality of ECUs 30 to 80 and the parking ECU 20 is operating even if the power-off delay time Toff has elapsed after a power-off instruction has been transmitted" is satisfied. The abnormality of the IG power supply system is an abnormality occurring in at least one of the IG relay 34 and the IG power supply 36.

Figure 16:
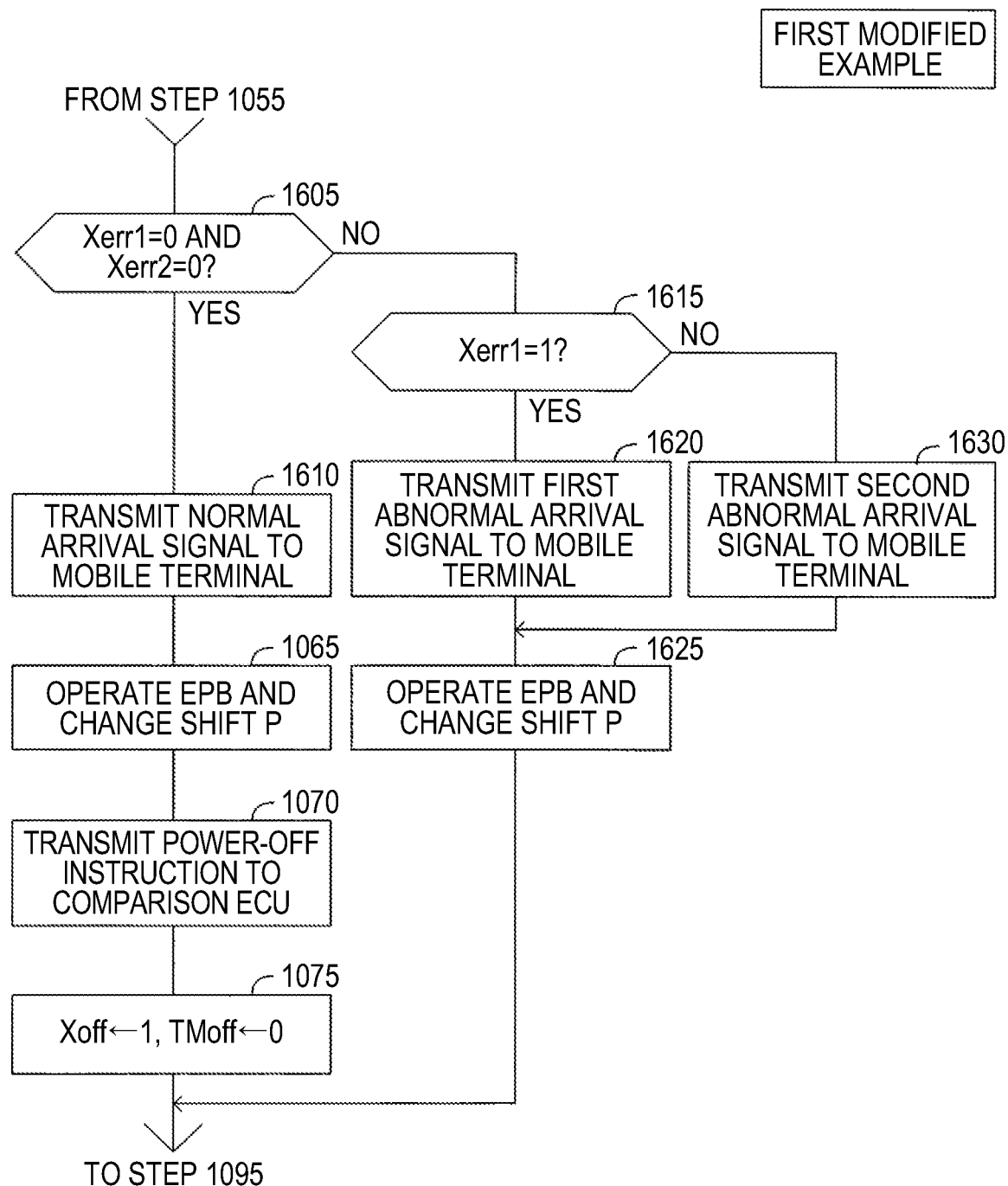
FIG. 16 is a flowchart illustrating a part of an automatic parking control routine which is performed by the CPU of the parking ECU according to the first modified example of the embodiment of the disclosure.

The first CPU in this modified example performs the start determination routine illustrated in FIG. 9, an automatic parking control routine (see FIG. 16) which is partially different from the automatic parking control illustrated in FIG. 10, and a power-off abnormality determination routine illustrated in FIG. 11. The first CPU performs a reason identification routine illustrated in FIG. 14.

Figure 17:
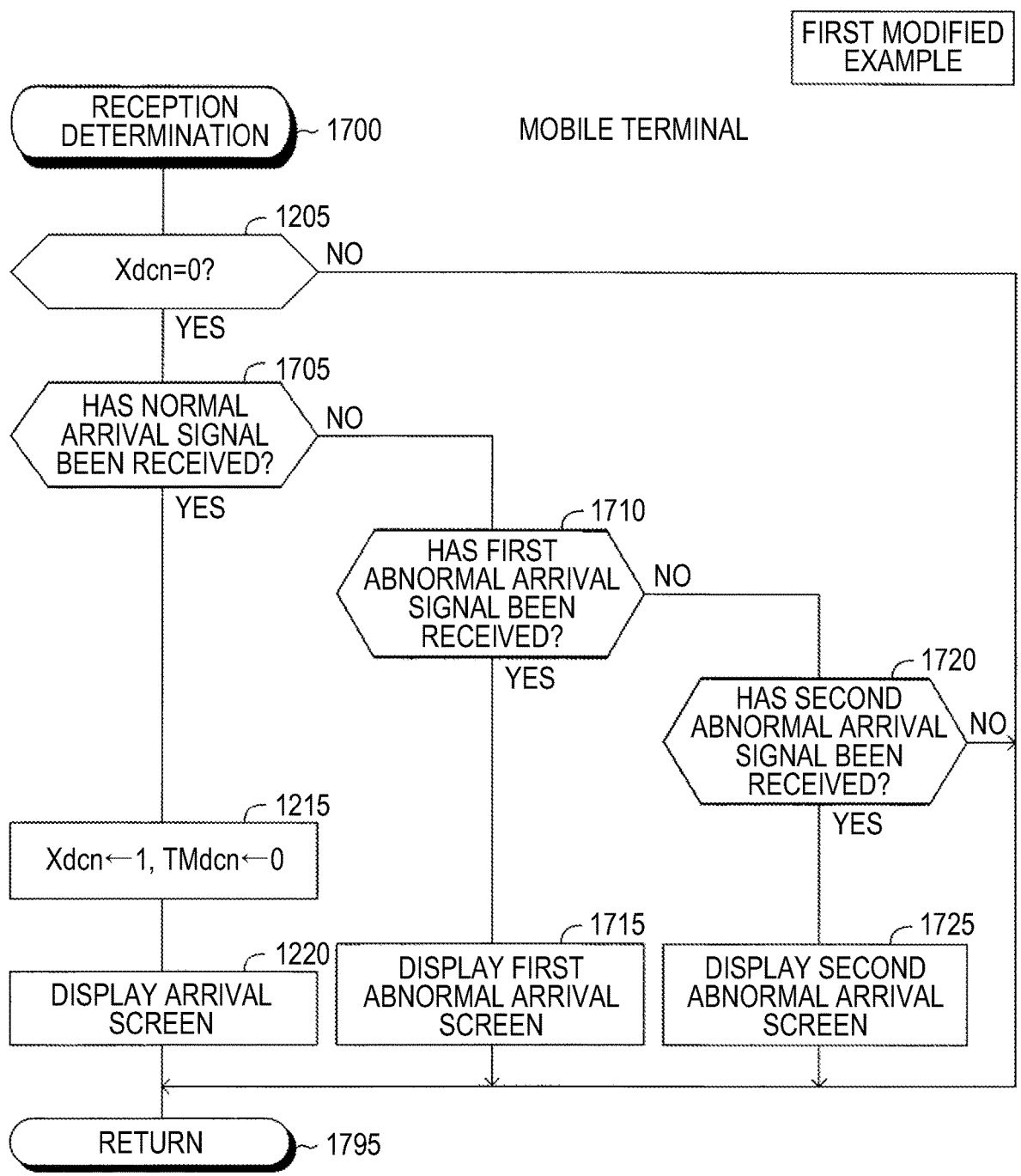
FIG. 17 is a flowchart illustrating a part of a reception determination routine which is performed by a CPU of the mobile terminal according to the first modified example of the embodiment of the disclosure.

The second CPU in this modified example performs a reception determination routine illustrated in FIG. 17 instead of the reception determination routine illustrated in FIG. 12 and performs a cutoff abnormality determination routine illustrated in FIG. 13.

Reason Identification Routine

Figure 14:
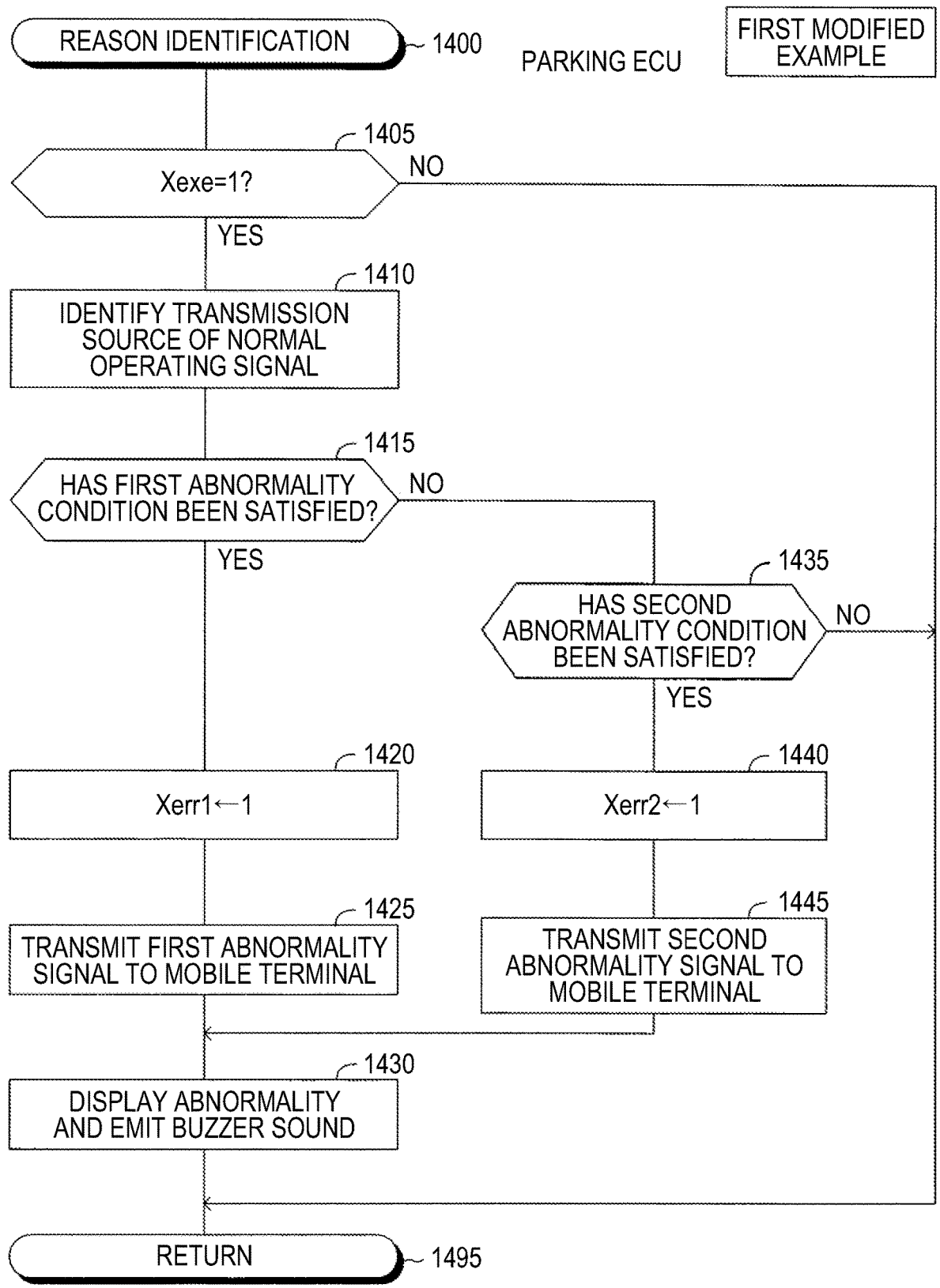
FIG. 14 is a flowchart illustrating a reason identification routine which is performed by a CPU of a parking ECU according to a first modified example of the embodiment of the disclosure.

The first CPU in this modified example performs a routine (a reason identification routine) of the flowchart illustrated in FIG. 14 whenever a predetermined time elapses.

Accordingly, at a predetermined timing, the first CPU starts the routine from Step 1400 in FIG. 14 and causes the routine to proceed to Step 1405. In Step 1405, the first CPU determines whether the value of the execution flag Xexe is "1."

When the value of the execution flag Xexe is "0," the first CPU determines "NO" in Step 1405 and then temporarily ends the routine in Step 1495.

When the value of the execution flag Xexe is "1," the first CPU determines "YES" in Step 1405 and sequentially performs Step 1410 and Step 1415.

Step 1410: The first CPU identifies an ECU which is a transmission source of a normal operating signal which has been received by the parking ECU 20 in a period until the routine is currently performed after the routine has been previously performed.

Step 1415: The first CPU determines whether the first abnormality condition has been satisfied.

When the first abnormality condition has been satisfied, the first CPU determines "YES" in Step 1415 and sequentially performs Step 1420 to Step 1430.

Step 1420: The first CPU sets a value of a first abnormality flag Xerr1 to "1."

The value of the first abnormality flag Xerr1 is set to "1" when the first abnormality has been satisfied and is set to "0" when an initial routine or a predetermined special operation has been performed. For example, the special operation is performed by a repairman when the vehicle VA is repaired.

Step 1425: The first CPU transmits a first abnormality signal to the mobile terminal 90. The first abnormality signal includes information capable of identifying occurrence of an abnormality with the first reason.

Step 1430: The first CPU performs the abnormality display and causes the speaker 26 to emit buzzer sound.

Thereafter, the first CPU temporarily ends the routine in Step 1495.

When the first abnormality condition has not been satisfied when the first CPU performs Step 1415, the first CPU determines "NO" in Step 1415 and causes the routine to proceed to Step 1435. In Step 1435, the first CPU determines whether the second abnormality condition has been satisfied.

When the second abnormality condition has not been satisfied, the first CPU determines "NO" in Step 1435 and then temporarily ends the routine in Step 1495.

When the second abnormality condition has been satisfied, the first CPU determines "YES" in Step 1435 and sequentially performs Step 1440 and Step 1445.

Step 1440: The first CPU sets a value of a second abnormality flag Xerr2 to "1."

The value of the second abnormality flag Xerr2 is set to "1" when the second abnormality condition has been satisfied and is set to "0" when the initial routine or the special operation has been performed.

Step 1445: The first CPU transmits a second abnormality signal to the mobile terminal 90. The second abnormality signal includes information capable of identifying occurrence of an abnormality with the second reason.

Thereafter, the first CPU temporarily ends the routine in Step 1495.

Figure 15A:
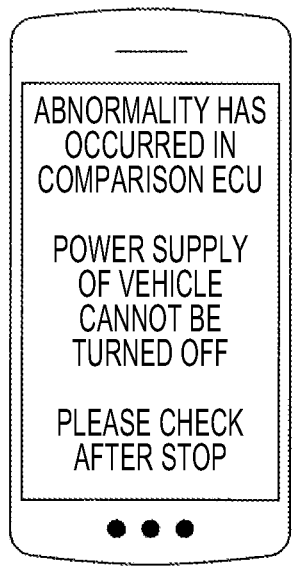
FIG. 15A is a diagram illustrating a first abnormality screen which is displayed on a mobile terminal according to the first modified example of the embodiment of the disclosure.

When the mobile terminal 90 has received the first abnormality signal, the second CPU displays a first abnormality screen illustrated in FIG. 15A on the display device 92. In the first abnormality screen, a message indicating that an abnormality has occurred in the comparison ECU 30 is displayed. Specifically, in the first abnormality screen, a message "The vehicle cannot be powered off due to an abnormality occurring in the comparison ECU. Please check after stop." is displayed.

Figure 15B:
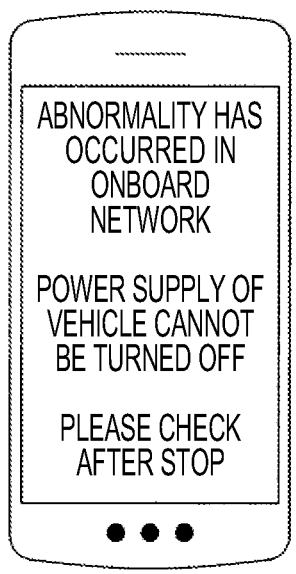
FIG. 15B is a diagram illustrating a second abnormality screen which is displayed on the mobile terminal according to the first modified example of the embodiment of the disclosure.

When the mobile terminal 90 has received the second abnormality signal, the second CPU displays a second abnormality screen illustrated in FIG. 15B on the display device 92. In the second abnormality screen, a message indicating that an abnormality has occurred in the CAN is displayed. Specifically, in the second abnormality screen, a message "The vehicle cannot be powered off due to an abnormality occurring in the comparison ECU. Please check after stop." is displayed.

Automatic Parking Control Routine

An automatic parking control routine which is performed by the first CPU according to this modified example will be described below. In this automatic parking control routine, Step 1005 to Step 1055 illustrated in FIG. 10 are performed. After Step 1055 has been performed, the first CPU causes the routine to proceed to Step 1605 in FIG. 16.

In Step 1605, the first CPU determines whether the value of the first abnormality flag Xerr1 is "0" and the value of the second abnormality flag Xerr2 is "0."

When value of the first abnormality flag Xerr1 is "0" and the value of the second abnormality flag Xerr2 is "0," the first CPU determines "YES" in Step 1605 and causes the routine to proceed to Step 1610.

In Step 1610, the first CPU transmits a normal arrival signal to the mobile terminal 90. The normal arrival signal is the same signal as the arrival signal transmitted in Step 1060 in FIG. 10. Thereafter, the first CPU sequentially performs Step 1065 to Step 1075 in FIG. 16 and then temporarily ends the routine in Step 1095 in FIG. 10.

When the value of at least one of the first abnormality flag Xerr1 and the second abnormality flag Xerr2 is "1," the first CPU determines "NO" in Step 1605 and causes the routine to proceed to Step 1615.

In Step 1615, the first CPU determines whether the value of the first abnormality flag Xerr1 is "1."

When the value of the first abnormality flag Xerr1 is "1," the first CPU determines "YES" in Step 1615 and sequentially performs Step 1620 and Step 1625.

Step 1620: The first CPU transmits a first abnormal arrival signal to the mobile terminal 90.

Step 1625: The first CPU operates the EPB and shifts the position of the shift lever 82a to "P."

Thereafter, the first CPU then temporarily ends the routine in Step 1095 in FIG. 10.

When the value of the first abnormality flag Xerr1 is "0" when the first CPU performs Step 1615, the determination result of Step 1605 is "NO" and thus the value of the second abnormality flag Xerr2 is "1." In this case, the first CPU determines "NO" in Step 1615 and transmits a second abnormal arrival signal to the mobile terminal 90 in Step 1630. After Step 1630 has been performed, the first CPU performs Step 1625 and then temporarily ends the routine in Step 1095 in FIG. 10.

Reception Determination Routine

The second CPU in this modified example performs a routine (a reception determination routine) of the flowchart illustrated in FIG. 17 whenever a predetermined time elapses. In FIG. 17, steps having the same processes as the steps illustrated in FIG. 12 will be referred to by the same reference signs and description thereof will be omitted.

At a predetermined timing, the second CPU starts the routine from Step 1700 in FIG. 17 and causes the routine to proceed to Step 1205 in FIG. 17. When the value of the cutoff determination flag Xdcn is "1," the second CPU determines "NO" in Step 1205 in FIG. 17 and then temporarily ends the routine in Step 1795.

When the value of the cutoff determination flag Xdcn is "0," the second CPU determines "YES" in Step 1205 in FIG. 17 and causes the routine to proceed to Step 1705. In Step 1705, the second CPU determines whether the mobile terminal 90 has received a normal arrival signal.

When the mobile terminal 90 has received a normal arrival signal, the second CPU determines "YES" in Step 1705 and sequentially performs Step 1215 and Step 1220 in FIG. 17. Thereafter, the second CPU temporarily ends the routine in Step 1795.

When the mobile terminal 90 has not received a normal arrival signal, the second CPU determines "NO" in Step 1705 and causes the routine to proceed to Step 1710. In Step 1710, the second CPU determines whether the mobile terminal 90 has received the first abnormal arrival signal.

Figure 18A:
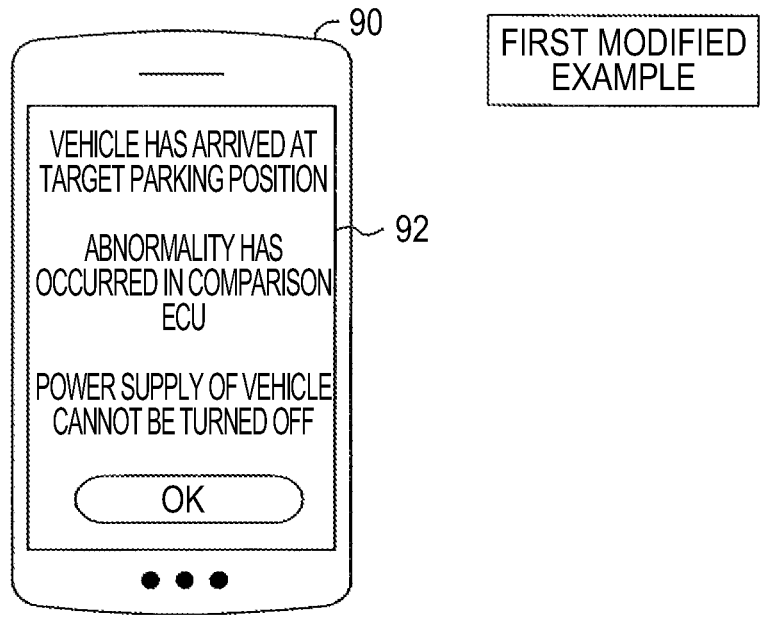
FIG. 18A is a diagram illustrating a first abnormal arrival screen which is displayed on the mobile terminal according to the first modified example of the embodiment of the disclosure.

When the mobile terminal 90 has received the first abnormal arrival signal, the second CPU determines "YES" in Step 1710 and causes the routine to proceed to Step 1715. In Step 1715, the second CPU displays a first abnormal arrival screen illustrated in FIG. 18A on the display device 92 and then temporarily ends the routine in Step 1795.

In the first abnormal arrival screen, a message indicating that the vehicle VA has arrived at the target parking position Ptgt and that the IG power supply 36 is not switched to the OFF state due to occurrence of an abnormality in the comparison ECU 30 is displayed. Specifically, in the first abnormal arrival screen, a message "The vehicle has arrived at the target parking position. The vehicle cannot be powered off due to an abnormality occurring in the comparison ECU." is displayed.

When the mobile terminal 90 has not received a first abnormal arrival signal, the second CPU determines "NO" in Step 1710 and causes the routine to proceed to Step 1720. In Step 1720, the second CPU determines whether the mobile terminal 90 has received a second abnormal arrival signal.

When the mobile terminal 90 has not received a second abnormal arrival signal, the second CPU determines "NO" in Step 1720 and then temporarily ends the routine in Step 1795.

Figure 18B:
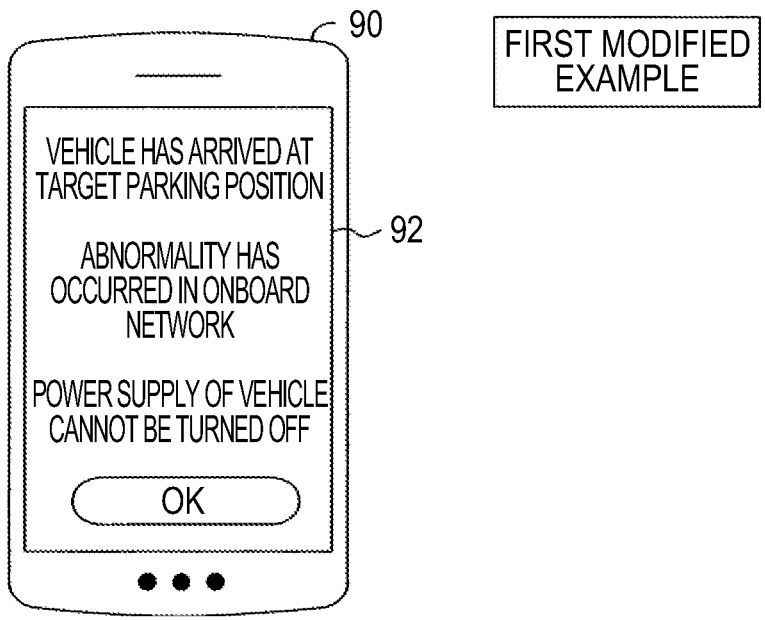
FIG. 18B is a diagram illustrating a second abnormal arrival screen which is displayed on the mobile terminal according to the first modified example of the disclosure.

When the mobile terminal 90 has received a second abnormal arrival signal, the second CPU determines "YES" in Step 1720 and causes the routine to proceed to Step 1725. In Step 1725, the second CPU displays a second abnormal arrival screen illustrated in FIG. 18B on the display device 92 and then temporarily ends the routine in Step 1795.

In the second abnormal arrival screen, a message indicating that the vehicle VA has arrived at the target parking position Ptgt and that the IG power supply 36 is not switched to the OFF state due to occurrence of an abnormality in the CAN is displayed. Specifically, in the second abnormal arrival screen, a message "The vehicle has arrived at the target parking position. The vehicle cannot be powered off due to an abnormality occurring in the onboard network." is displayed.

Figure 19A:
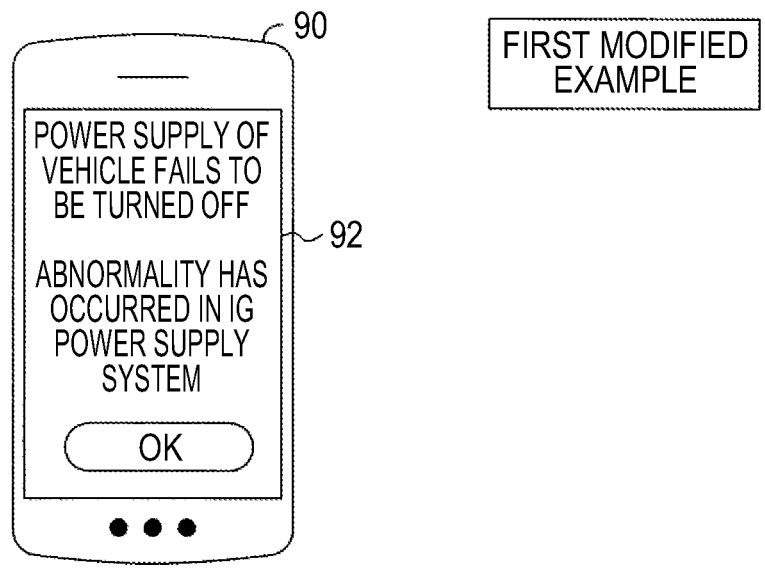
FIG. 19A is a diagram illustrating an abnormality screen which is displayed on the mobile terminal according to the first modified example of the embodiment of the disclosure.

When the mobile terminal 90 has received an abnormality signal ("YES" in Step 1310 in FIG. 13), the second CPU displays an abnormality screen illustrated in FIG. 19A in Step 1330.

In the abnormality screen illustrated in FIG. 19A, a message indicating that the IG power supply 36 is not switched to the OFF state due to occurrence of an abnormality in the IG power supply system is displayed. Specifically, in the abnormality screen, a message "The vehicle fails to be powered off. An abnormality has occurred in the IG power supply system." is displayed.

Figure 19B:
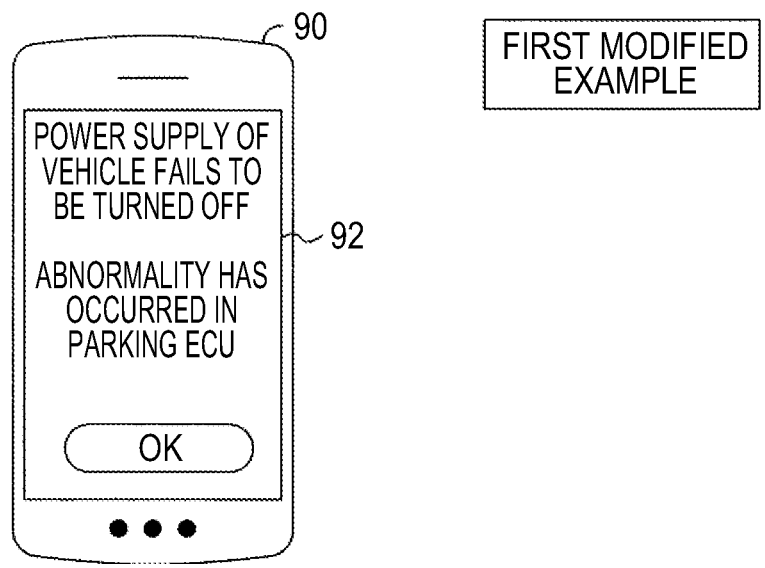
FIG. 19B is a diagram illustrating an abnormality screen which is displayed on the mobile terminal according to the first modified example of the embodiment of the disclosure.

When the radio communicative connection is not cut off even if the cutoff delay time Tdcn has elapsed after the arrival signal has been received ("YES" in Step 1325 in FIG. 13), the second CPU displays an abnormality screen illustrated in FIG. 19B in Step 1330.

In the abnormality screen illustrated in FIG. 19B, a message indicating that the IG power supply 36 is not switched to the OFF state due to occurrence of an abnormality in the parking ECU 20 is displayed. Specifically, in the abnormality screen, a message "The vehicle fails to be powered off. An abnormality has occurred in the parking ECU." is displayed.

When the IG power supply 36 is not switched to the OFF state and the mobile terminal 90 has not received an abnormality signal, there is a high likelihood that the parking ECU 20 will not be able to transmit an abnormality signal due to occurrence of an abnormality in the parking ECU 20. Accordingly, with the abnormality screen illustrated in FIG. 19B, a user is notified that an abnormality has occurred in the parking ECU 20.

In this modified example, the first CPU may not perform Step 1425 and Step 1440 in FIG. 14. In this case, the first abnormality screen illustrated in FIG. 15A and the second abnormality screen illustrated in FIG. 15B are not displayed on the display device 92. When the first abnormal condition or the second abnormal condition has been satisfied, the first abnormal arrival screen or the second abnormal arrival screen illustrated in FIG. 15A is displayed when the vehicle VA has arrived at the target parking position Ptgt. A user can understand an abnormality in which the IG power supply is not switched to the OFF state and a reason for the abnormality without waiting for elapse of the power-off delay time Toff after the power-off instruction has been transmitted.

An ECU other than the parking ECU 20 may perform abnormality determination based on a normal operating signal and notify the result of determination to the parking ECU 20.

Second Modified Example

The number of clearance sonars 22 and the number of cameras 23 described above in the embodiments are an example, and the disclosure is not limited to the numbers described above in the embodiments.

Third Modified Example

The parking support device 10 can be mounted in a vehicle such as an engine vehicle, a hybrid electric vehicle (HEV), a plug-in hybrid electric vehicle (PHEV), a fuel cell electric vehicle (FCEV), or a battery electric vehicle (BEV).

The disclosure can also be understood as a non-transitory storage medium in which a program for realizing the functions of the parking support device 10 is stored and which can be read by a computer

What is claimed is:
1. A parking support device comprising:
a power supply configured to supply electric power to a device mounted in a vehicle;
a first control unit configured to:
be switched to an operating state by supplying electric power from the power supply when the power supply is in an ON state and to be switched to a non-operating state by stopping supply of electric power from the power supply when the power supply is in an OFF state,
perform parking support control including
power-off control for automatically switching the power supply from the ON state to the OFF state when an arrival condition that the vehicle travels and arrives at a preset target parking position is satisfied, and
automatic parking control for causing the vehicle to travel autonomously to the target parking position and to stop at the target parking position in accordance with an instruction signal transmitted to the vehicle by a mobile terminal of which communicative connection with the vehicle to enable data exchange is able to be set up and which is carried by a user,
perform abnormality notification for notifying the user of the vehicle that a power-off abnormality in which the power supply is not switched to the OFF state has occurred when a power-off abnormality condition that the first control unit is not switched to the non-operating state in a period from starting of the power-off control to elapse of a predetermined power-off delay time is satisfied,
perform the abnormality notification by transmitting an abnormality signal for causing the mobile terminal to display an abnormality screen for notifying the user that the power-off abnormality has occurred to the mobile terminal when the power-off abnormality condition is satisfied,
identify a reason for the power-off abnormality,
transmit the abnormality signal including information capable of identifying the reason for the power-off abnormality to the mobile terminal such that the mobile terminal displays the abnormality screen in a mode in which the reason for the power-off abnormality is able to be identified,
a second control unit configured to switch the power supply to one of the ON state and the OFF state; and
a third control unit,
wherein the first control unit, the second control unit, and the third control unit are connected to each other such that data exchange is possible via an onboard network and are configured to transmit a normal operating signal via the onboard network whenever a predetermined transmission time elapses, and
wherein the first control unit is configured to:
identify the reason for the power-off abnormality as being an abnormality of the second control unit when the normal operating signal from the second control unit is not received and the normal operating signal from the third control unit is received;
identify the reason for the power-off abnormality as being an abnormality of the onboard network when the normal operating signals from none of the second control unit and the third control unit are received; and
identify the reason for the power-off abnormality as being an abnormality of the power supply when the normal operating signals from the second control unit and the third control unit are received and the power-off abnormality condition is satisfied.

2. The parking support device according to claim 1, wherein the first control unit is configured to perform the abnormality notification before the power-off abnormality condition is satisfied when an abnormality of the second control unit or an abnormality of the onboard network has been identified.

3. A parking support device comprising:
a power supply configured to supply electric power to a device mounted in a vehicle;
a first electric control unit, including a processor and a memory, configured to:
be switched to an operating state by supplying electric power from the power supply when the power supply is in an ON state and to be switched to a non-operating state by stopping supply of electric power from the power supply when the power supply is in an OFF state,
perform parking support control including
power-off control for automatically switching the power supply from the ON state to the OFF state when an arrival condition that the vehicle travels and arrives at a preset target parking position is satisfied, and
automatic parking control for causing the vehicle to travel autonomously to the target parking position and to stop at the target parking position in accordance with an instruction signal transmitted to the vehicle by a mobile terminal of which communicative connection with the vehicle to enable data exchange is able to be set up and which is carried by a user,
perform abnormality notification for notifying the user of the vehicle that a power-off abnormality in which the power supply is not switched to the OFF state has occurred when a power-off abnormality condition that the first electric control unit is not switched to the non-operating state in a period from starting of the power-off control to elapse of a predetermined power-off delay time is satisfied,
perform the abnormality notification by transmitting an abnormality signal for causing the mobile terminal to display an abnormality screen for notifying the user that the power-off abnormality has occurred to the mobile terminal when the power-off abnormality condition is satisfied,
identify a reason for the power-off abnormality,
transmit the abnormality signal including information capable of identifying the reason for the power-off abnormality to the mobile terminal such that the mobile terminal displays the abnormality screen in a mode in which the reason for the power-off abnormality is able to be identified,
a second electric control unit, including a processor and a memory, configured to switch the power supply to one of the ON state and the OFF state; and
a third electric control unit including a processor and a memory,
wherein the first electric control unit, the second electric control unit, and the third electric control unit are connected to each other such that data exchange is possible via an onboard network and are configured to transmit a normal operating signal via the onboard network whenever a predetermined transmission time elapses, and
wherein the first electric control unit is configured to:
identify the reason for the power-off abnormality as being an abnormality of the second electric control unit when the normal operating signal from the second electric control unit is not received and the normal operating signal from the third electric control unit is received;
identify the reason for the power-off abnormality as being an abnormality of the onboard network when the normal operating signals from none of the second electric control unit and the third electric control unit are received; and
identify the reason for the power-off abnormality as being an abnormality of the power supply when the normal operating signals from the second electric control unit and the third electric control unit are received and the power-off abnormality condition is satisfied.

* * * * *